US012811702B2

(12) United States Patent
Hirzallah et al.

(10) Patent No.: US 12,811,702 B2
(45) Date of Patent: Nov. 24, 2026

(54) RAY-TRACING AT A USER EQUIPMENT BASED ON RAY TRACING CONFIGURATION

(71) Applicant: QUALCOMM Incorporated, San Diego, CA (US)

(72) Inventors: Mohammed Ali Mohammed Hirzallah, San Marcos, CA (US); Varun Amar Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 18/649,355

(22) Filed: Apr. 29, 2024

(65) Prior Publication Data

US 2025/0337511 A1 Oct. 30, 2025

(51) Int. Cl.
*H04B 17/391* (2015.01)

(52) U.S. Cl.
CPC ................................ *H04B 17/3912* (2015.01)

(58) Field of Classification Search
CPC ............................ H04B 17/3912; G06T 15/06
See application file for complete search history.

(56) References Cited

U.S. PATENT DOCUMENTS

| | | | | |
|---|---|---|---|---|
| 10,715,263 | B2 * | 7/2020 | Wada | H04W 64/00 |
| 11,252,731 | B1 * | 2/2022 | Levitsky | H04B 7/0695 |
| 2022/0029713 | A1 | 1/2022 | Hannula et al. | |
| 2023/0078932 | A1 | 3/2023 | Burgess et al. | |
| 2023/0085270 | A1 | 3/2023 | Zirwas et al. | |
| 2025/0139324 | A1 * | 5/2025 | Johari | G06F 30/18 |

FOREIGN PATENT DOCUMENTS

| | | | | |
|---|---|---|---|---|
| CN | 115085840 | A | | 9/2022 |
| CN | 115656641 | A | * | 1/2023 |
| CN | 116405948 | A | | 7/2023 |
| CN | 116916332 | A | | 10/2023 |
| CN | 117119380 | A | | 11/2023 |
| WO | WO-2021191176 | A1 | | 9/2021 |

OTHER PUBLICATIONS

Boas BV, Zirwas W, Haardt M. Machine learning for CSI recreation in the digital twin based on prior knowledge. IEEE Open Journal of the Communications Society. Sep. 21, 2022;3:1578-91. (Year: 2022).*

International Search Report and Written Opinion—PCT/US2025/021869—ISA/EPO—Jul. 7, 2025.

* cited by examiner

*Primary Examiner* — Fayyaz Alam
(74) *Attorney, Agent, or Firm* — Thien T. Nguyen

(57) ABSTRACT

Aspects of the disclosure are directed to ray-tracing (RT) configurations (e.g., RT parameters such as the number of reflections, refractions (transmissions through walls), diffractions, scattering type/modeling, etc., and so on) for a RT procedure associated with modeling one or more wireless channels in an environment. In an aspect, a user equipment (UE) performs the RT procedure based on a model of the environment and a respective RT configuration. The UE transmits a RT report based on the RT procedure to a network component (e.g., a digital twin (DT) entity, location management function (LMF), or sensing management function (SnMF)), which may then utilize the RT report to update a digital twin (DT) of the environment. Such aspects may provide various technical advantages, such as more efficient RT procedures, higher quality RT procedures, more accurate DT modeling, etc.

48 Claims, 16 Drawing Sheets

EXAMPLE OF 2D RT USING SBR METHOD

RAY-TRACING AT A USER EQUIPMENT BASED ON RAY TRACING CONFIGURATION

BACKGROUND OF THE DISCLOSURE

1. Field of the Disclosure

Aspects of the disclosure relate generally to wireless technologies.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method performed by a user equipment (UE) includes determining a ray-tracing (RT) configuration for a RT procedure associated with modeling one or more wireless channels in an environment; performing the RT procedure based on a model of the environment and the RT configuration; and transmitting a RT report based on the RT procedure to a network component.

In an aspect, a method performed by a network component includes receiving a ray-tracing (RT) report based on a RT procedure that is performed by a user equipment and is associated with modeling one or more wireless channels in an environment, the RT procedure based on a model of the environment and a RT configuration; and updating a digital twin (DT) of the environment based on the RT report.

In an aspect, a user equipment (UE) includes one or more memories; one or more transceivers; and one or more processors communicatively coupled to the one or more memories and the one or more transceivers, the one or more processors, either alone or in combination, configured to: determine a ray-tracing (RT) configuration for a RT procedure associated with modeling one or more wireless channels in an environment; perform the RT procedure based on a model of the environment and the RT configuration; and transmit, via the one or more transceivers, a RT report based on the RT procedure to a network component.

In an aspect, a network component includes one or more memories; one or more transceivers; and one or more processors communicatively coupled to the one or more memories and the one or more transceivers, the one or more processors, either alone or in combination, configured to: receive, via the one or more transceivers, a ray-tracing (RT) report based on a RT procedure that is performed by a user equipment and is associated with modeling one or more wireless channels in an environment, the RT procedure based on a model of the environment and a RT configuration; and update a digital twin (DT) of the environment based on the RT report.

In an aspect, a user equipment (UE) includes means for determining a ray-tracing (RT) configuration for a RT procedure associated with modeling one or more wireless channels in an environment; means for performing the RT procedure based on a model of the environment and the RT configuration; and means for transmitting a RT report based on the RT procedure to a network component.

In an aspect, a network component includes means for receiving a ray-tracing (RT) report based on a RT procedure that is performed by a user equipment and is associated with modeling one or more wireless channels in an environment, the RT procedure based on a model of the environment and a RT configuration; and means for updating a digital twin (DT) of the environment based on the RT report.

In an aspect, a non-transitory computer-readable medium storing computer-executable instructions that, when executed by a user equipment (UE), cause the UE to: determine a ray-tracing (RT) configuration for a RT procedure associated with modeling one or more wireless channels in an environment; perform the RT procedure based on a model of the environment and the RT configuration; and transmit a RT report based on the RT procedure to a network component.

In an aspect, a non-transitory computer-readable medium storing computer-executable instructions that, when executed by a network component, cause the network component to: receive a ray-tracing (RT) report based on a RT procedure that is performed by a user equipment and is associated with modeling one or more wireless channels in an environment, the RT procedure based on a model of the environment and a RT configuration; and update a digital twin (DT) of the environment based on the RT report.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

In FIG. 7, a cone of diffracted rays is depicted. In FIG. 8, diffraction fields are depicted.

DETAILED DESCRIPTION

Figure 1:
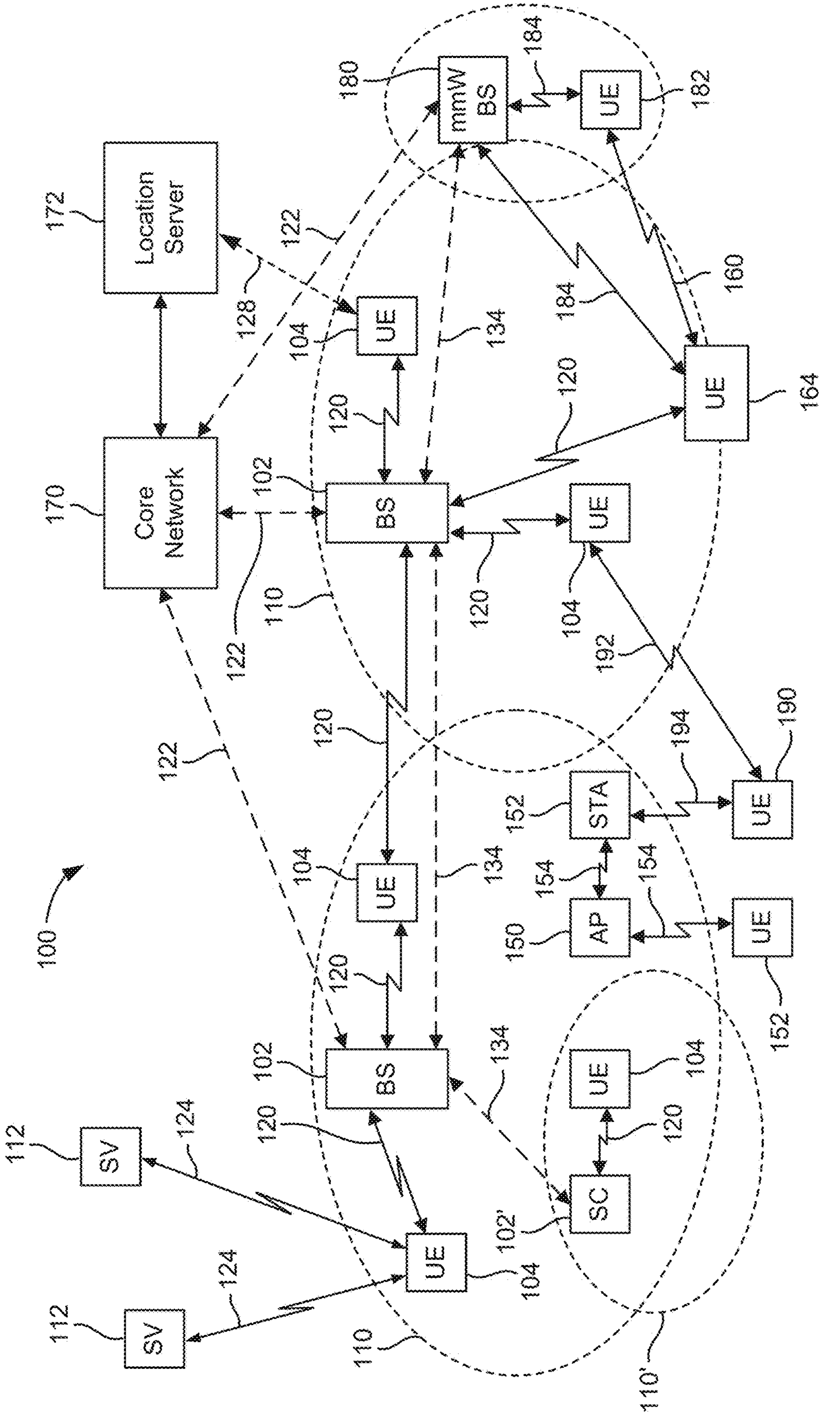
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to ray-tracing (RT) at a user equipment (UE) based on RT configuration. In an aspect, a digital twin (DT) can be thought of as a digital replica of an existing entity in real world that characterizes and models its behavior, interactions, state, or evolution over time. DT can be an instrumental tool for large number of applications in 6G wireless network. A DT can be constructed for a wireless channel and one straightforward option is to rely on raytracing (RT) for modeling. A DT of a wireless channel can involve RT as a key modeling component. RT mimics and approximates electromagnetic waves by justifying their behavior in a computational manner. Many underlaying theories and approaches may be utilized for RT, as summarized above.

Although RT is an instrumental tool for simulating wireless signal propagation and DT modeling, RT also has some challenges. For example, RT can be quite computationally expensive depending on how intricate the modeling needs to be done, and RT may require validation using real-world measurements which can also help in calibrating the RT process. In an aspect, a positioning solution may be implemented. For example, some smart phones (i.e., UEs) can have gaming/rendering accelerators, which can be used to offload some or all of a complex RT procedure in a distributed fashion. In addition, smart phones can have access to measurements, which can be used to validate RT outcomes and apply proper calibrations. In an aspect, RT and related validation/calibration can be easily applied on some capable UEs without need to report validation/calibration data to the network (NW). One challenge of this potential solution Particular aspects of the subject matter described in this disclosure can be implemented to realize one or more of the following potential advantages. Aspects of the disclosure are directed to ray-tracing (RT) configurations (e.g., RT parameters such as the number of reflections, refractions (transmissions through walls), diffractions, scattering type/modeling, etc., and so on) for a RT procedure associated with modeling one or more wireless channels in an environment. In an aspect, a user equipment (UE) performs the RT procedure based on a model of the environment and a respective RT configuration. The UE transmits a RT report based on the RT procedure to a network component (e.g., a digital twin (DT) entity, location management function (LMF), or sensing management function (SnMF)), which may then utilize the RT report to update a digital twin (DT) of the environment. Such aspects may provide various technical advantages, such as more efficient RT procedures, higher quality RT procedures, more accurate DT modeling, etc.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
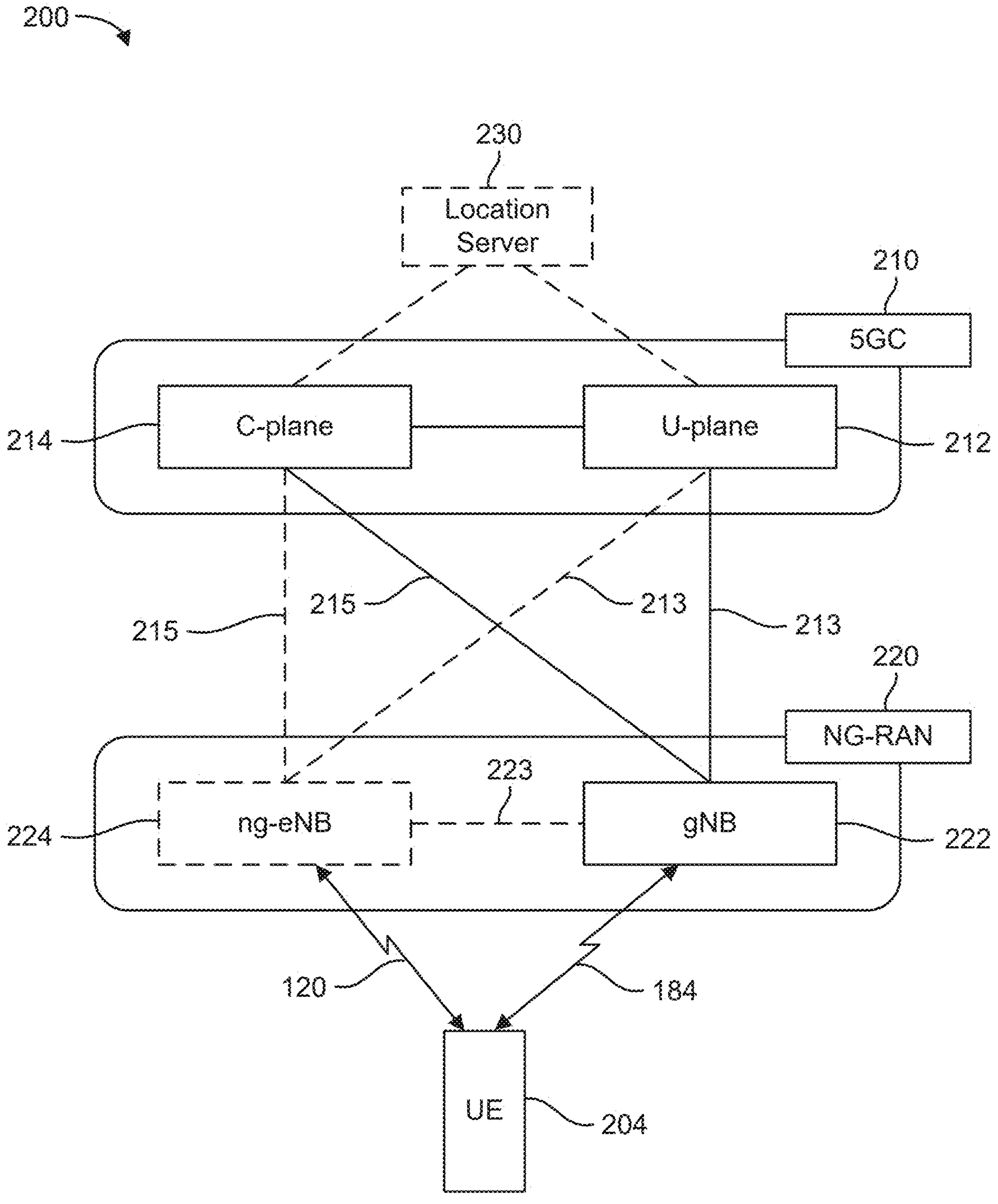
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-cNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
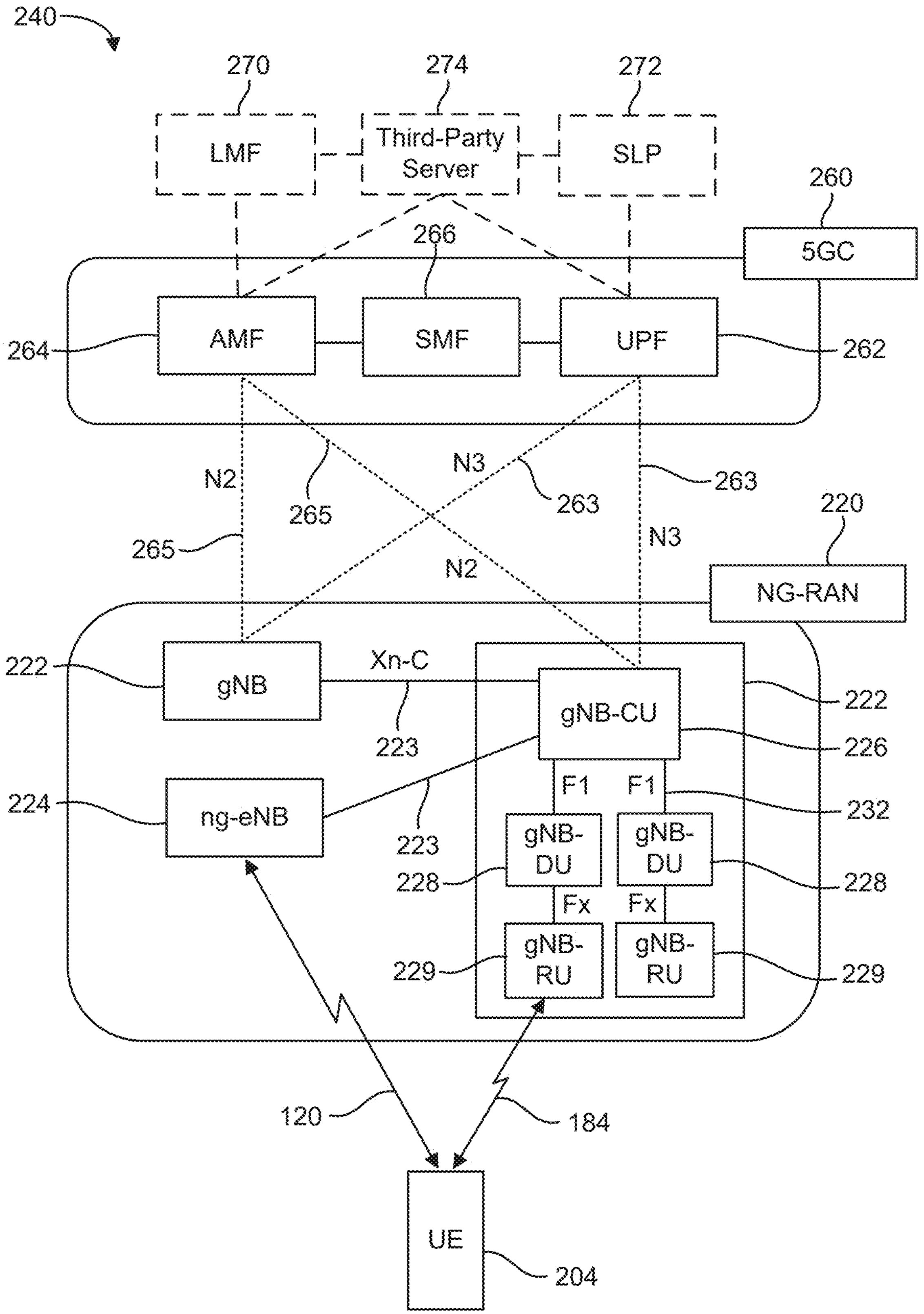

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-cNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-cNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (CNB), NR base station, 5G NB, AP, TRP, cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
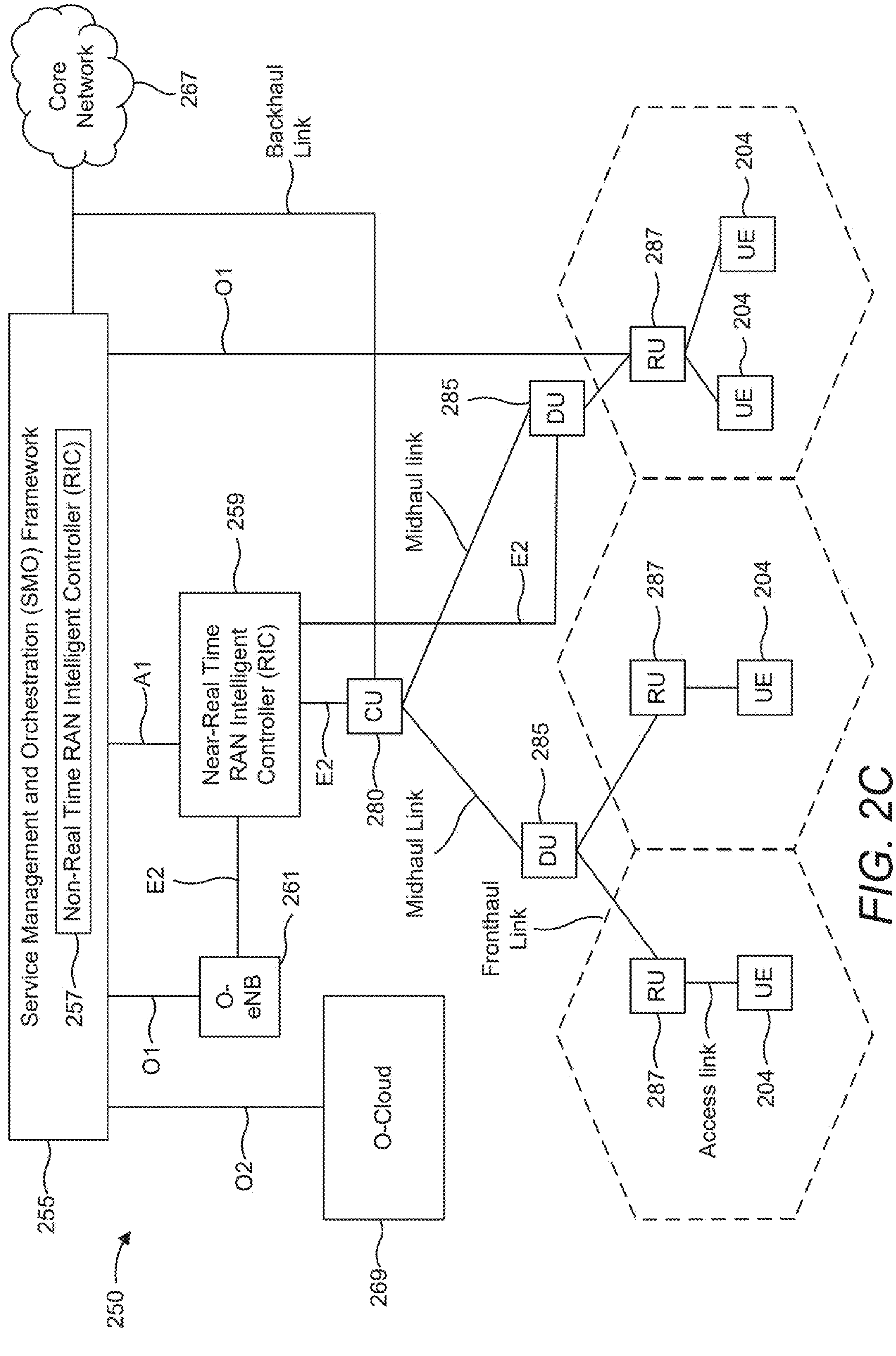

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
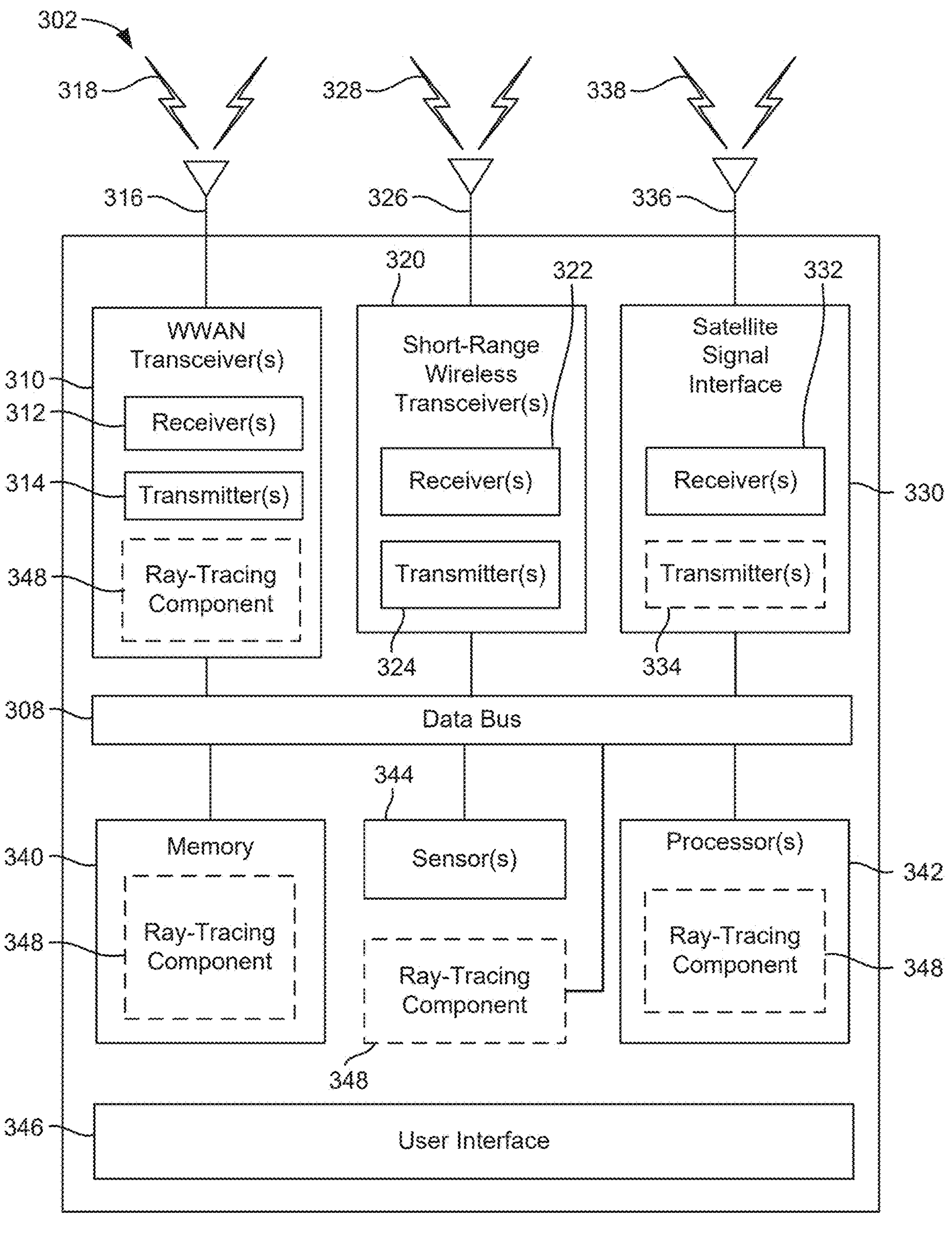
FIGS. 3A, 3B, and 3C are simplified block diagrams of several sample aspects of components that may be employed in a user equipment (UE), a base station, and a network entity, respectively, and configured to support communications as taught herein.
Figure 3B:
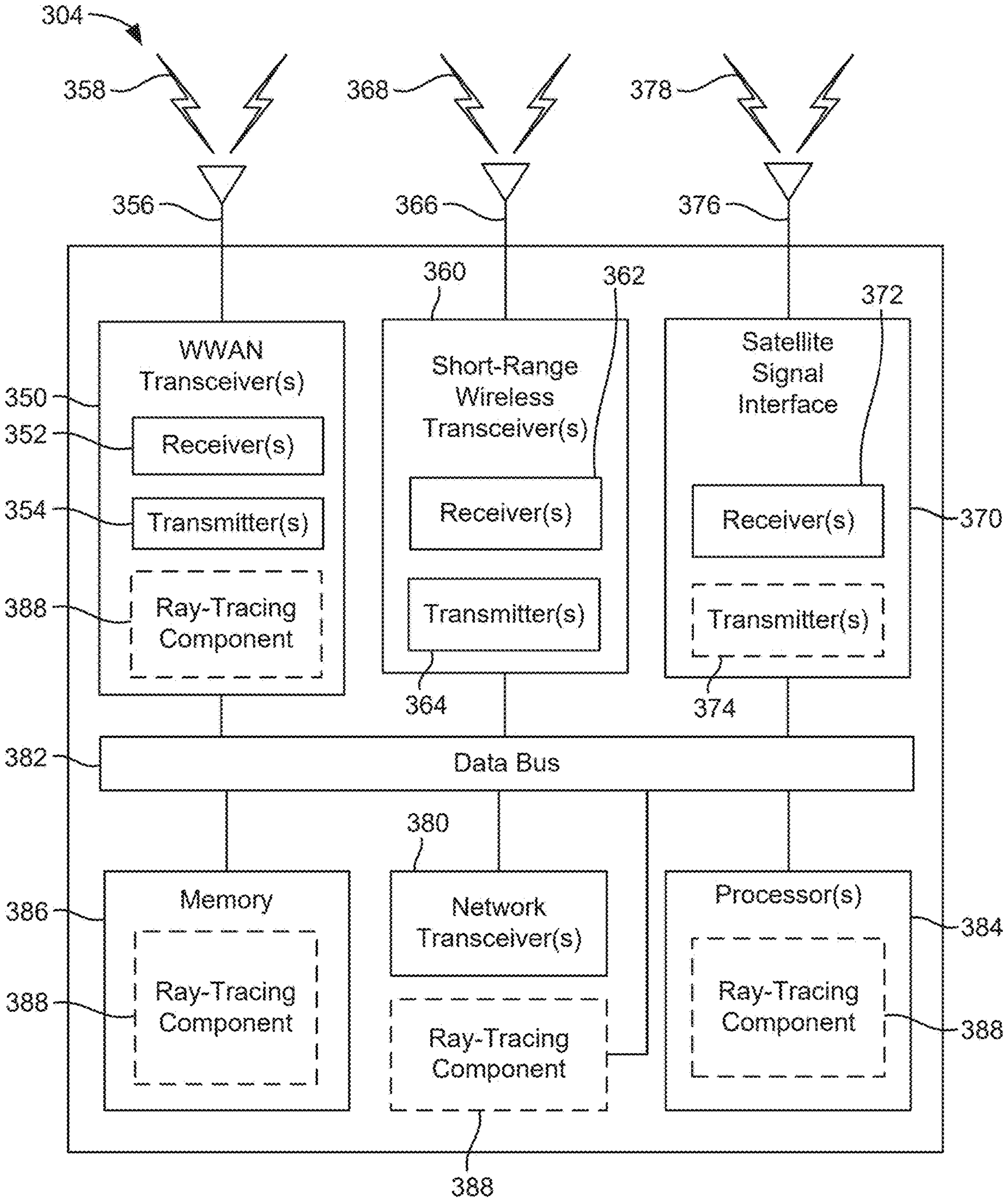
Figure 3C:
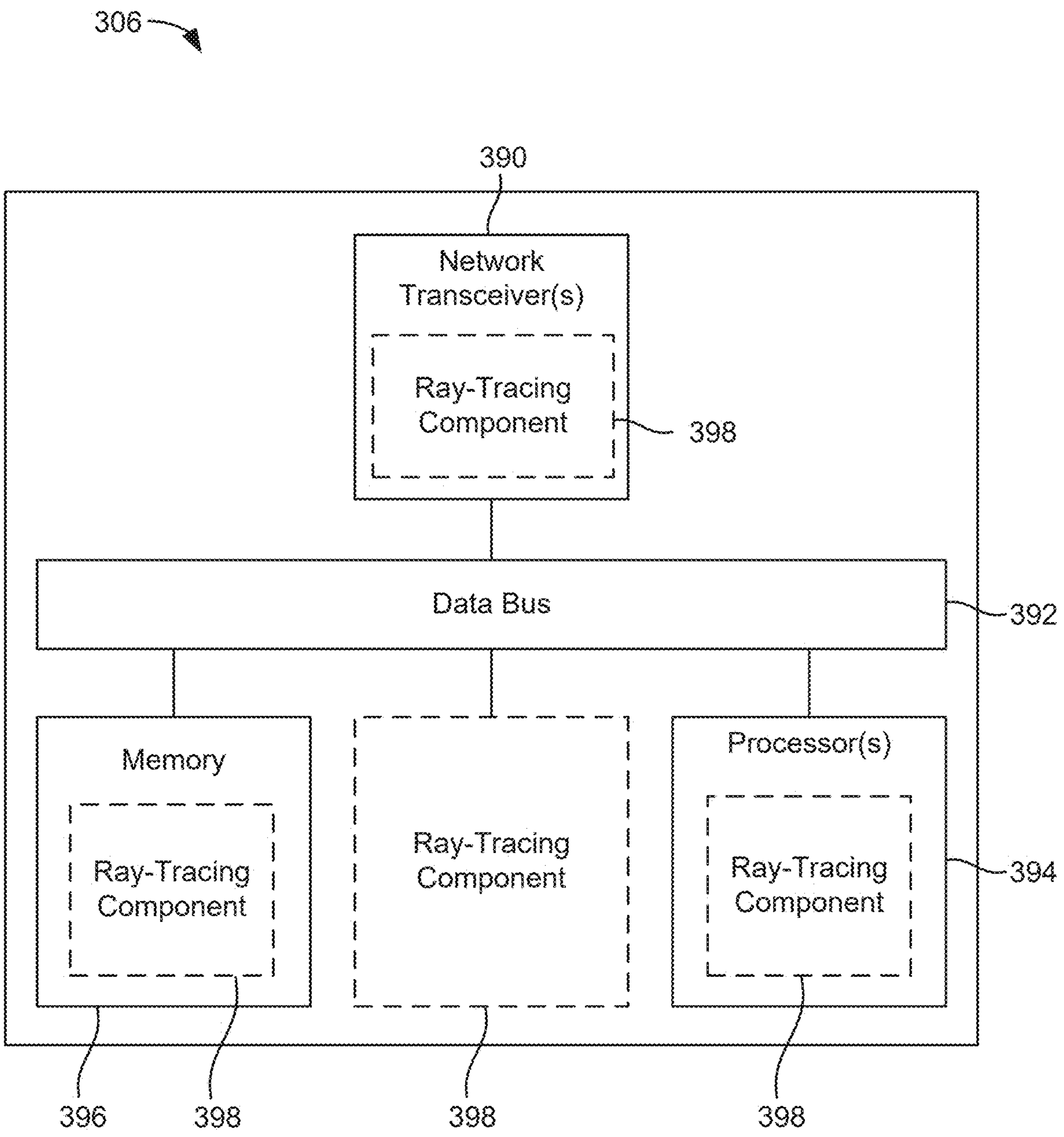

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., cNBs, gNBs), etc., via at least one designated RAT (e.g., NR, LTE, GSM, etc.) over a wireless communication medium of interest (e.g., some set of time/ frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEER and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal interfaces 330 and 370, which each include one or more satellite signal receivers 332 and 372, respectively, and may optionally include one or more satellite signal transmitters 334 and 374, respectively. In some cases, the base station 304 may be a terrestrial base station that may communicate with space vehicles (e.g., space vehicles 112) via the satellite signal interface 370. In other cases, the base station 304 may be a space vehicle (or other non-terrestrial entity) that uses the satellite signal interface 370 to communicate with terrestrial networks and/or other space vehicles.

The satellite signal receivers 332 and 372 may be connected to one or more antennas 336 and 376, respectively, and may provide means for receiving and/or measuring satellite positioning/communication signals 338 and 378, respectively. Where the satellite signal receiver(s) 332 and 372 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS) signals, etc. Where the satellite signal receiver(s) 332 and 372 are non-terrestrial network (NTN) receivers, the satellite positioning/communication signals 338 and 378 may be communication signals (e.g., carrying control and/or user data) originating from a 5G network. The satellite signal receiver(s) 332 and 372 may comprise any suitable hardware and/or software for receiving and processing satellite positioning/communication signals 338 and 378, respectively. The satellite signal receiver(s) 332 and 372 may request information and operations as appropriate from the other systems, and, at least in some cases, perform calculations to determine locations of the UE 302 and the base station 304, respectively, using measurements obtained by any suitable satellite positioning system algorithm.

The optional satellite signal transmitter(s) 334 and 374, when present, may be connected to the one or more antennas 336 and 376, respectively, and may provide means for transmitting satellite positioning/communication signals 338 and 378, respectively. Where the satellite signal transmitter(s) 374 are satellite positioning system transmitters, the satellite positioning/communication signals 378 may be GPS signals, GLONASS® signals, Galileo signals, Beidou signals, NAVIC, QZSS signals, etc. Where the satellite signal transmitter(s) 334 and 374 are NTN transmitters, the satellite positioning/communication signals 338 and 378 may be communication signals (e.g., carrying control and/or user data) originating from a 5G network. The satellite signal transmitter(s) 334 and 374 may comprise any suitable hardware and/or software for transmitting satellite positioning/communication signals 338 and 378, respectively. The satellite signal transmitter(s) 334 and 374 may request information and operations as appropriate from the other systems.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 342, 384, and 394, respectively, for providing functionality relating to, for example, wireless communication, and for providing other processing functionality. The processors 342, 384, and 394 may therefore provide means for processing, such as means for determining, means for calculating, means for receiving, means for transmitting, means for indicating, etc. In an aspect, the processors 342, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include RT component 348, 388, and 398, respectively. The RT component 348, 388, and 398 may be hardware circuits that are part of or coupled to the processors 342, 384, and 394, respectively, that, when executed, cause the UE 302, the base station 304, and the network entity 306 to perform the functionality described herein. In other aspects, the RT component 348, 388, and 398 may be external to the processors 342, 384, and 394 (e.g., part of a modem processing system, integrated with another processing system, etc.). Alternatively, the RT component 348, 388, and 398 may be memory modules stored in the memories 340, 386, and 396, respectively, that, when executed by the processors 342, 384, and 394 (or a modem processing system, another processing system, etc.), cause the UE 302, the base station 304, and the network entity 306 to perform the functionality described herein. FIG. 3A illustrates possible locations of the RT component 348, which may be, for example, part of the one or more WWAN transceivers 310, the memory 340, the one or more processors 342, or any combination thereof, or may be a standalone component. FIG. 3B illustrates possible locations of the RT component 388, which may be, for example, part of the one or more WWAN transceivers 350, the memory 386, the one or more processors 384, or any combination thereof, or may be a standalone component. FIG. 3C illustrates possible locations of the RT component 398, which may be, for example, part of the one or more network transceivers 390, the memory 396, the one or more processors 394, or any combination thereof, or may be a standalone component.

The UE 302 may include one or more sensors 344 coupled to the one or more processors 342 to provide means for sensing or detecting movement and/or orientation information that is independent of motion data derived from signals received by the one or more WWAN transceivers 310, the one or more short-range wireless transceivers 320, and/or the satellite signal interface 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 342. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 342, which implements Layer-3 (L3) and Layer-2 (L2) functionality.

In the downlink, the one or more processors 342 provides demultiplexing between transport and logical channels, packet reassembly, deciphering, header decompression, and control signal processing to recover IP packets from the core network. The one or more processors 342 are also responsible for error detection.

Similar to the functionality described in connection with the downlink transmission by the base station 304, the one or more processors 342 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal interface 330, or may omit the sensor(s) 344, and so on. In another example, in case of FIG. 3B, a particular implementation of the base station 304 may omit the WWAN transceiver(s) 350 (e.g., a Wi-Fi “hotspot” access point without cellular capability), or may omit the short-range wireless transceiver(s) 360 (e.g., cellular-only, etc.), or may omit the satellite signal interface 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 308, 382, and 392, respectively. In an aspect, the data buses 308, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 308, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 342, 384, 394, the transceivers 310, 320, 350, and 360, the memories 340, 386, and 396, the RT component 348, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Ray-tracing is a 3D computer graphics technique that simulates how radio frequency signals (e.g., light, etc.) travel and interact with objects in a scene. Various rendering algorithms may be utilized for generating digital images via ray-tracing.

In some designs, ray-tracing may be performed in three stages. At Stage 1, a 3D environment is constructed. For example, a 3D computer aided design (CAD) model is constructed and its features are specified (e.g., materials such as permittivity, permeability and/or conductivity, transmitter (TX) and receiver (RX) locations, mobility, waveforms and/or antennas, number of reflections, number of penetrations, number of diffractions, scattering parameters, minimum power, etc.). At Stage 2, paths finding is performed. For example, possible paths between TX and RX points are found and validated. Techniques such as shoot & bounce ray (SBR), image method (IM), and hybrid method may be utilized at Stage 2, as discussed below in more detail. At Stage 3, electromagnetic (EM) calculations are performs. For example, EM fields for valid rays (e.g., using High Frequency Asymptotic techniques) may be calculated. Examples of such High Frequency Asymptotic techniques include Geometric Optics (GO), Uniform Asymptotic Theory (UAT), Geometric Theory of Diffraction (GTD), Uniform Theory of Diffraction (UTD), Physical Optics, Spectral Methods, Multi-edge Diffraction Methods: Deygout model, Epstein-Peterson model, Lambertian Scattering, Directive Scattering, Directive Backscattering, Multiple Scattering Theory, and so on.

Figure 4:
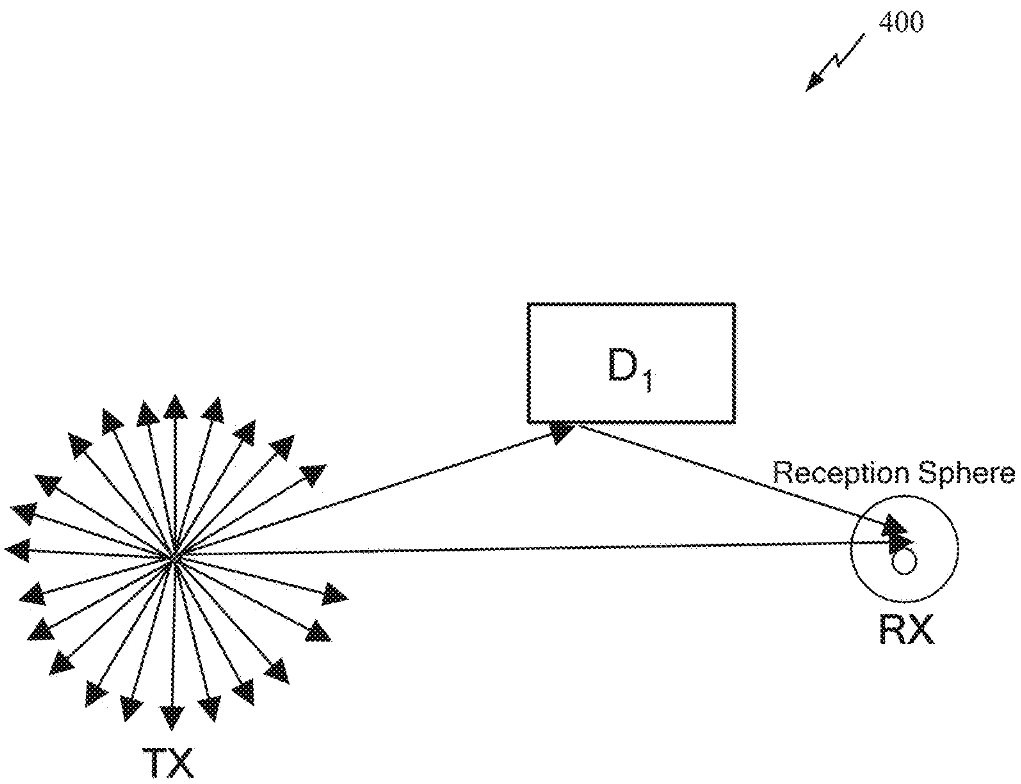
FIG. 4 illustrates a shoot-bounce ray (SBR) ray-tracing technique, in accordance with aspects of the disclosure.

FIG. 4 illustrates a SBR ray-tracing technique 400, in accordance with aspects of the disclosure. In the SBR ray-tracing technique 400 (alternatively referred to as a ray launching technique), a surface of a circle/sphere around TX is tessellated into small arcs/circles/polygons. Rays are launched from TX in all directions, with one for each tessellation (w. solid angle resolution, a.k.a., ray tube) and traced until they hit a sphere around RX. Various ray types can be used depending on the desired characteristics & accuracy, as discussed below with respect to FIG. 5. Radius of reception sphere may be set to $\alpha d/\sqrt{3}$, where $\alpha$ is angle between adjacent rays and d is the ray length. In an aspect, $\alpha$ and sphere radius at RX control the tradeoff between accuracy and complexity. Rays are terminated if they exit the environment or meet certain termination criteria (e.g., max number of reflections, diffractions, etc.).

Figure 5:
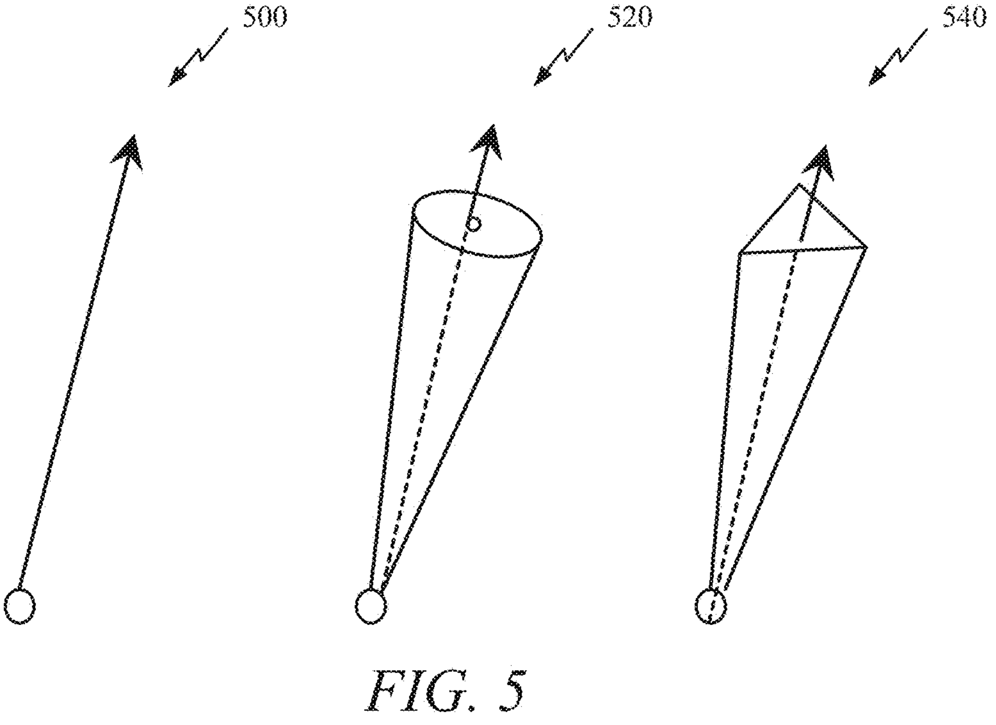
FIG. 5 illustrates ray types, in accordance with aspects of the disclosure.

FIG. 5 illustrates ray types, in accordance with aspects of the disclosure. At 500, a line ray type 500 is depicted. At 520, a cone (circular) ray type 520 is depicted. At 540, a triangular ray type 540 is depicted.

Figure 6:
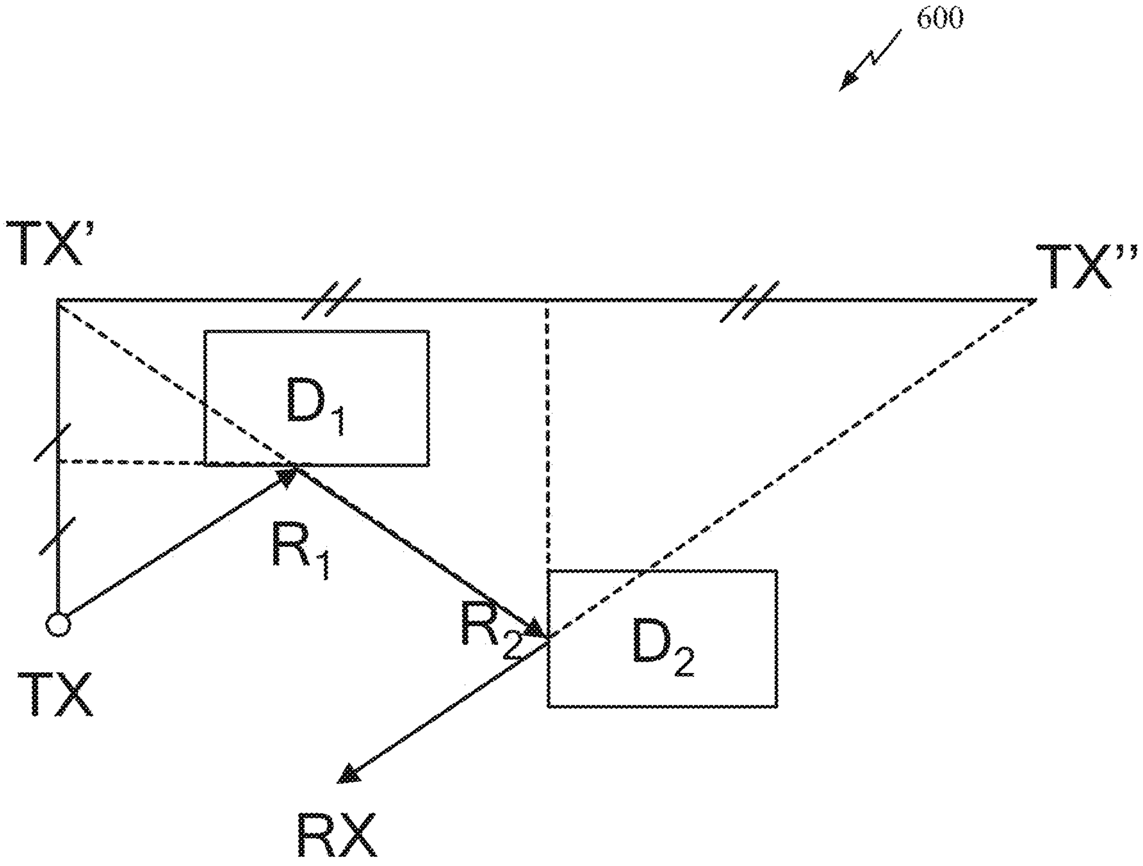
FIG. 6 illustrates an image method ray-tracing technique, in accordance with aspects of the disclosure.

FIG. 6 illustrates an image method ray-tracing technique 600, in accordance with aspects of the disclosure. In the image method ray-tracing technique 600, images of TX and/or RX points reflected off visible faces in the environment are obtained. For simplicity, the image method ray-tracing technique 600 only depicts the first and second order images of the TX. Each surface of an object in the environment is considered as a mirror to determine reflections. First and higher order image reflections can be determined (e.g., TX' and TX") to find paths between TX and RX points. Modeling complex phenomenon such as diffraction, scattering etc. may be challenging in the image method. Some models have been developed to incorporate these phenomenon. The image method ray-tracing technique 600 may be simple to implement and reasonably accurate (e.g., rays are not quantized at the TX, and a sphere of reception around RX need not be utilized). However, the image method ray-tracing technique 600 may become inefficient when an environment involves large number of faces (e.g., large number of building walls and higher order image reflections) and/or surfaces with curvature.

In other designs, a combination of SBR and Image methods may be utilized. In this case, rays are launched from TX using SBR to find initial path interactions with environment, after which the image method is applied to these interaction points to fine tune and determine accurate paths to RX. A sequence of SBR and image methods can be employed sequentially to trace complicated scenarios. In an aspect, if the launched rays intersect an edge, diffraction point and path to RX point may be determined using Fermat's principle of least time. Diffraction and reflection points are selected such that ray travels the shortest distance from TX to RX points.

Figure 7:
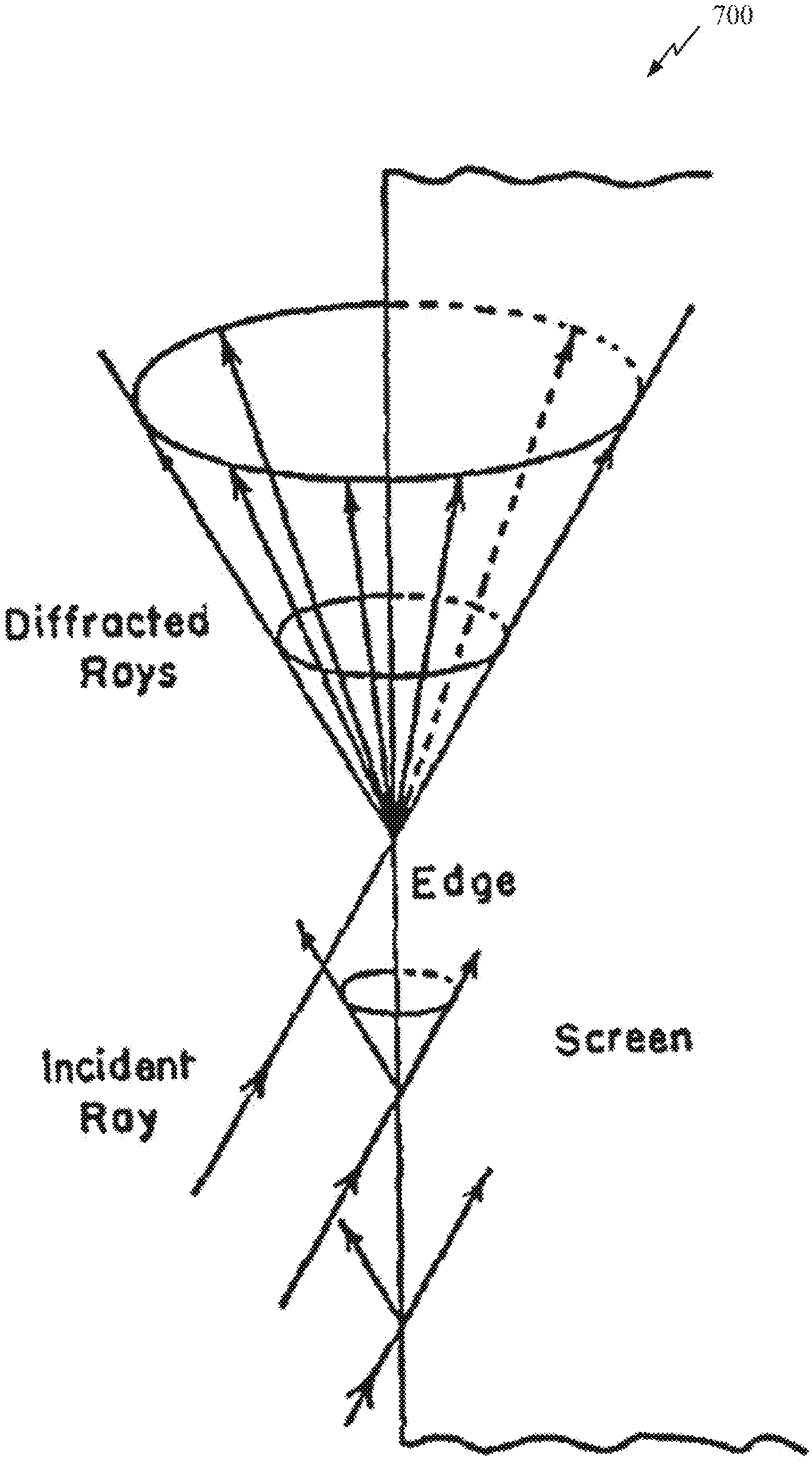
FIGS. 7-8 illustrate a diffraction ray-tracing technique, in accordance with aspects of the disclosure.
Figure 8:
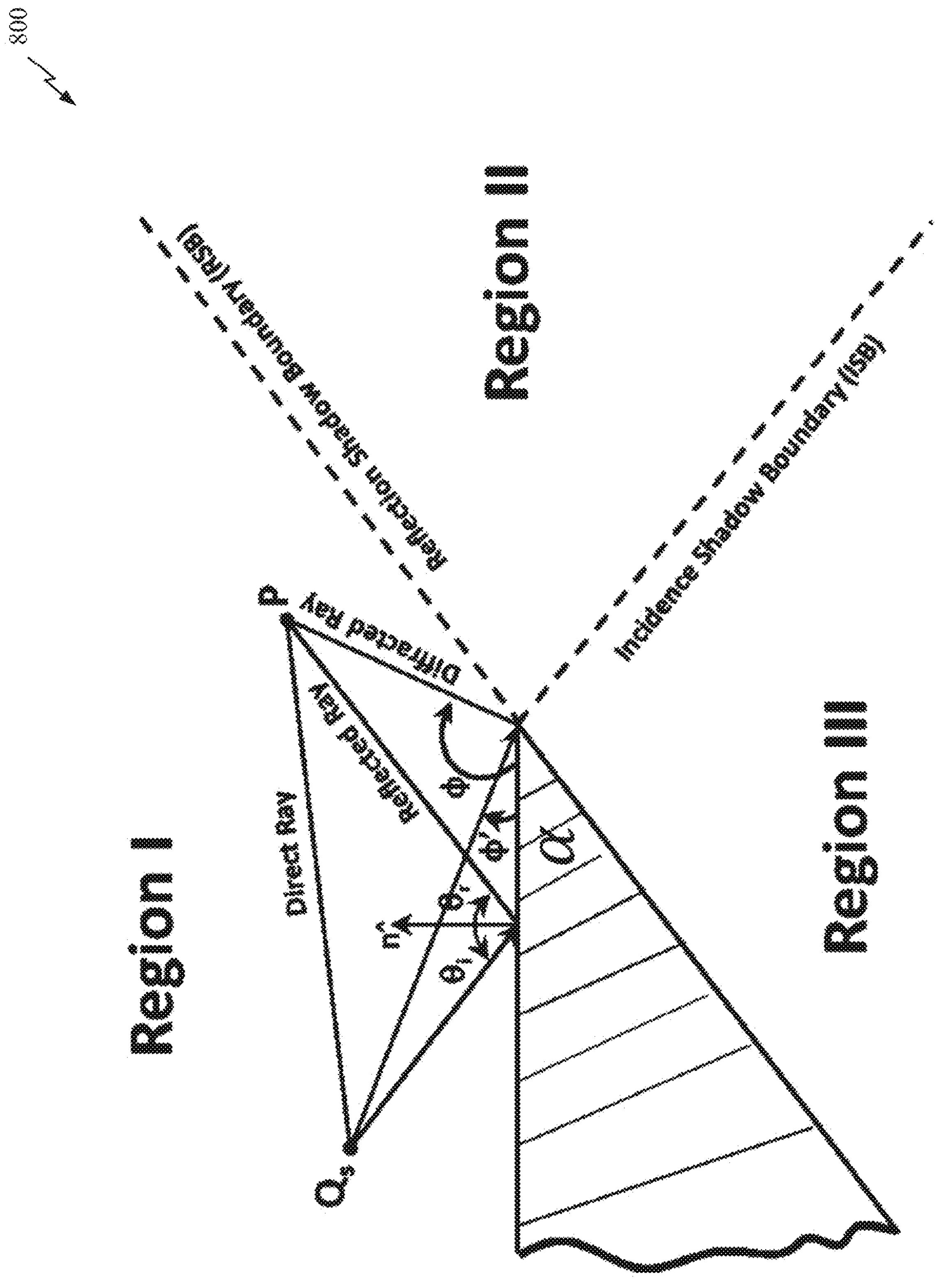

FIGS. 7-8 illustrate a diffraction ray-tracing technique, in accordance with aspects of the disclosure. In FIG. 7, a cone 700 of diffracted rays is depicted. In FIG. 8, diffraction fields 800 are depicted.

Referring to FIGS. 7-8, sharp discontinuity and/or curvatures in surfaces result in shadow regions and cause waves to diffract in multiple directions. In some cases, geometric optics (GO) fails in describing diffracted waves in both shadow regions as well as lit-regions. In this case, geometric theory of diffraction (GTD) adds new component to GO fields that account for diffraction (based on Keller diffraction function). Note that GTD is still subject to discontinuities at boundaries (i.e., reflection shadow boundary (RSB) and incident shadow boundary (ISB)). Uniform theory of diffraction (UTD) resolves discontinuities by adding scalar diffraction coefficients that enforce continuity of total fields across shadow regions using special functions (e.g., Fresnel transition function).

In some designs, a scattering ray-tracing technique may be implemented. In an aspect, in case of a non-smooth surface, Surface imperfections are comparable to A. Such a surface cannot be easily described using simple geometrical objects. Reflections are no longer specular and happen in random directions. Scattered reflections from trees, lampposts, traffic signals, road signs, etc., can contribute significantly to received power (≥1 GHZ). Scattering from non-smooth surfaces is modeled by a stochastic process called diffuse scattering (Fresnel coefficients can be modified to account for power of non-specular reflections). Scattering may be captured through stochastic models. Diffuse scattering coefficient S may be defined as the ratio between magnitude of scattered electric field and incident electric field. Simulation time is dramatically increased when scattering is modeled. Scattering off a rough surface can be evaluated by considering scattering from a small patch (i.e., dS) and integrating scattering impact over surfaces (i.e., $$\int_0^S f(s)ds).$$

In some designs, a diffuse scattering ray-tracing technique may be implemented. One example of a diffuse scattering ray-tracing technique is the Lambertian Model. The Lambertian Model is a simple non-directional scattering model in which scattered fields are concentrated toward normal of the surface. Another example of a diffuse scattering ray-tracing technique is the Directive Model. In the Directive Model, scattered fields are directive and scattered in a forward scattering lobe (a controls the narrowness of the lobe). Another example of a diffuse scattering ray-tracing technique is the Backscatter Model. The Backscatter Model is a directive model that allows backscatter towards incidence point in addition to the forward scattered lobe (B controls the narrowness of the lobe).

In an aspect, a digital twin (DT) can be thought of as a digital replica of an existing entity in real world that characterizes and models its behavior, interactions, state, or evolution over time. DT can be an instrumental tool for large number of applications in 6G wireless network. A DT can be constructed for a wireless channel and one straightforward option is to rely on raytracing (RT) for modeling. A DT of a wireless channel can involve RT as a key modeling component. RT mimics and approximates electromagnetic waves by justifying their behavior in a computational manner. Many underlaying theories and approaches may be utilized for RT, as summarized above.

Although RT is an instrumental tool for simulating wireless signal propagation and DT modeling, RT also has some challenges. For example, RT can be quite computationally expensive depending on how intricate the modeling needs to be done, and RT may require validation using real-world measurements which can also help in calibrating the RT process.

In an aspect, a positioning solution may be implemented. For example, some smart phones (i.e., UEs) can have gaming/rendering accelerators, which can be used to offload some or all of a complex RT procedure in a distributed fashion. In addition, smart phones can have access to measurements, which can be used to validate RT outcomes and apply proper calibrations. In an aspect, RT and related validation/calibration can be easily applied on some capable UEs without need to report validation/calibration data to the network (NW). One challenge of this potential solution is that signaling of RT parameters can be daunting and may need to be optimized.

Aspects of the disclosure are directed to ray-tracing (RT) configurations (e.g., RT parameters such as the number of reflections, refractions (transmissions through walls), diffractions, scattering type/modeling, etc., and so on) for a RT procedure associated with modeling one or more wireless channels in an environment. In an aspect, a user equipment (UE) performs the RT procedure based on a model of the environment and a respective RT configuration. The UE transmits a RT report based on the RT procedure to a network component (e.g., a digital twin (DT) entity, location management function (LMF), or sensing management function (SnMF)), which may then utilize the RT report to update a digital twin (DT) of the environment. Such aspects may provide various technical advantages, such as more efficient RT procedures, higher quality RT procedures, more accurate DT modeling, etc.

Figure 9:
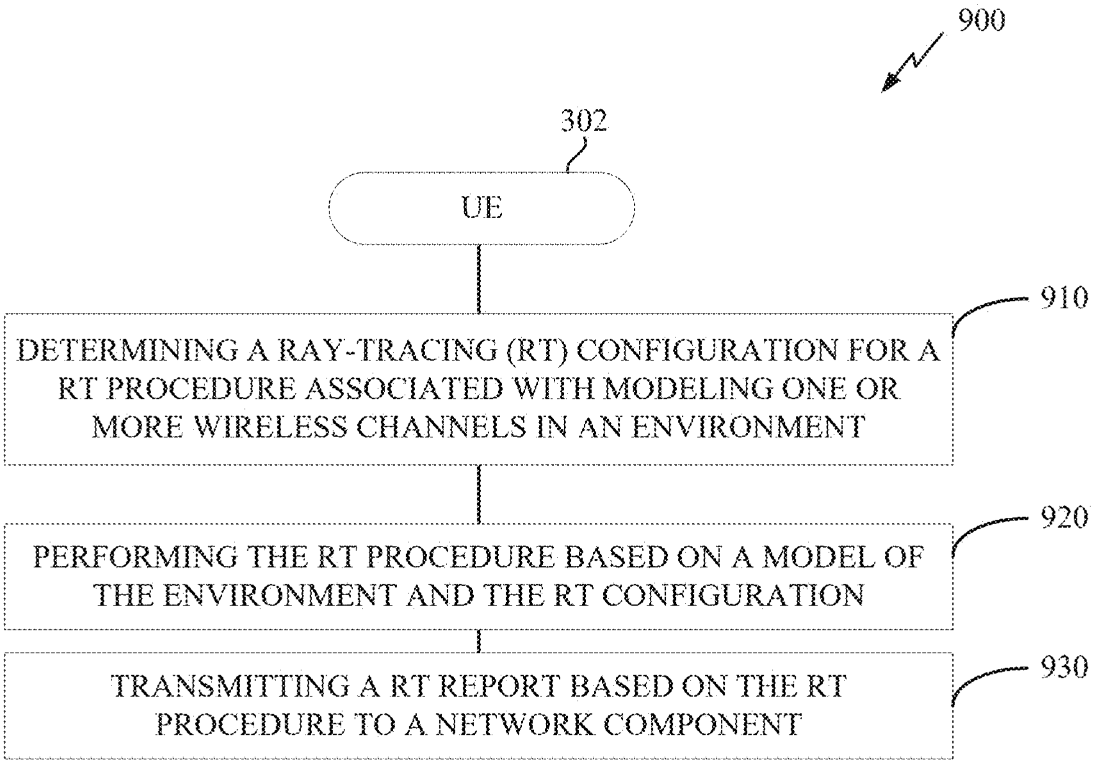
FIG. 9 illustrates an exemplary process of communications according to an aspect of the disclosure.

FIG. 9 illustrates an exemplary process 900 of communications according to an aspect of the disclosure. The process 900 of FIG. 9 is performed by a UE, such as UE 302.

Referring to FIG. 9, at 910, the UE (e.g., receiver 312 or 322, processor(s) 342, RT component 348, etc.) determines a ray-tracing (RT) configuration for a RT procedure associated with modeling one or more wireless channels in an environment. In an aspect, the RT configuration may be independently determined at the UE. In other aspects, the RT configuration may be received from a network component (e.g., a server UE or anchor UE, a DT entity or LMF or SnMF, etc.). In some designs, a means for performing the determination of 910 includes receiver 312 or 322, processor (s) 342, RT component 348, etc., of FIG. 3A.

Referring to FIG. 9, at 920, the UE (e.g., processor(s) 342, RT component 348, etc.) performs the RT procedure based on a model of the environment and the RT configuration. For example, the performance of the RT procedure may comprise performing a set of RT calculations (e.g., for a single ray, multiple rays, etc.) and/or performing a subset of those calculations and providing an output for further calculation at a network entity (e.g., in an aspect, such RT calculations may be performed based on human-written code execution and/or execution of one or more machine learning (ML) models). In some designs, a means for performing the RT procedure of 920 includes processor(s) 342, RT component 348, etc., of FIG. 3A.

Referring to FIG. 9, at 930, the UE (e.g., transmitter 314 or 324, etc.) determines a RT report based on the RT procedure to a network component. In some designs, a means for performing the transmission of 930 includes transmitter 314 or 324, etc., of FIG. 3A.

Figure 10:
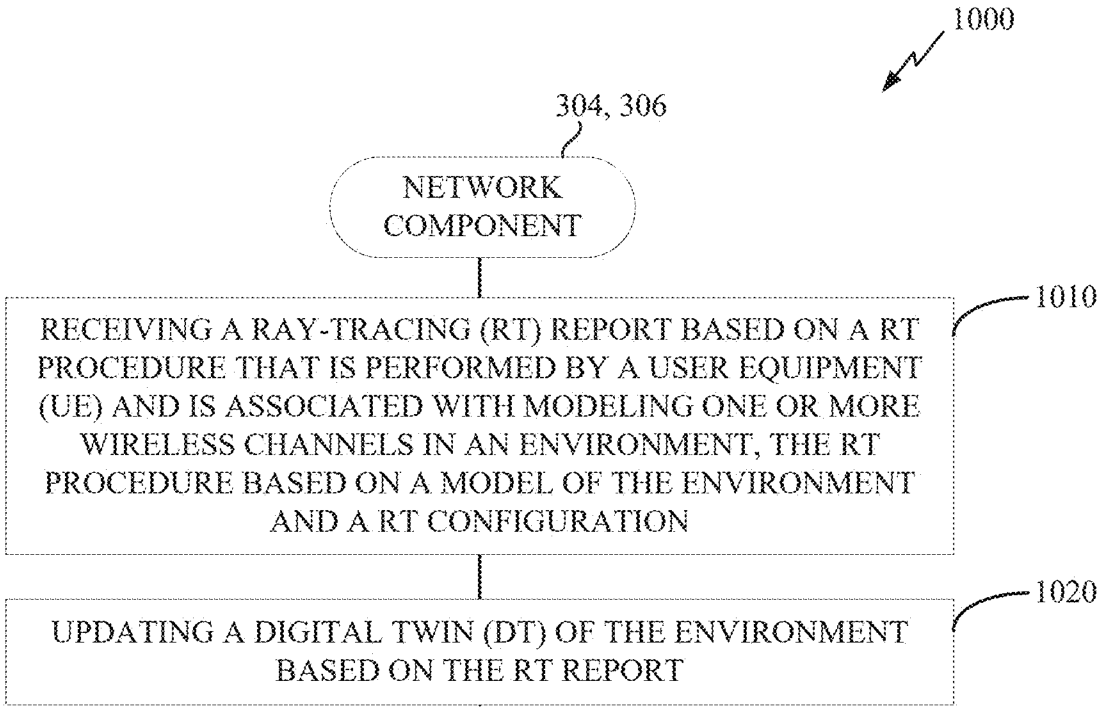
FIG. 10 illustrates an exemplary process of communications according to an aspect of the disclosure.

FIG. 10 illustrates an exemplary process 1000 of communications according to an aspect of the disclosure. The process 1000 of FIG. 10 is performed by a network component (e.g., (e.g., a server UE or anchor UE, a DT entity or LMF or SnMF, etc.).

Referring to FIG. 10, at 1010, the network component (e.g., receiver 312 or 322 or 352 or 362, network transceiver (s) 380 or 390, etc.) receives a ray-tracing (RT) report based on a RT procedure that is performed by a user equipment and is associated with modeling one or more wireless channels in an environment, the RT procedure based on a model of the environment and a RT configuration. In some designs, a means for performing the reception of 1010 includes receiver 312 or 322 or 352 or 362, network transceiver(s) 380 or 390, etc., of FIGS. 3A-3C.

Referring to FIG. 10, at 1020, the network component (e.g., processor(s) 342 or 384 or 394, RT component 348 or 388 or 398, memory 340 or 386 or 396, etc.) updates a digital twin (DT) of the environment based on the RT report. In an aspect, a means for performing the DT update of 1020 includes processor(s) 342 or 384 or 394, RT component 348 or 388 or 398, memory 340 or 386 or 396, etc., of FIGS. 3A-3C.

Referring to FIGS. 9-10, in some designs (which may contribute to more efficient RT procedures, higher quality RT procedures, more accurate DT modeling, etc.), the RT configuration includes, e.g.:

- a RT technique corresponding to one of a shoot-bounce ray (SBR) technique, an image technique, or a combination thereof, or
- a RT resolution, or
- one or more radio propagation parameters, or
- one or more diffraction parameters, or
- one or more scattering parameters, or
- one or more spatial parameters, or
- one or more RT modeling parameters, or
- one or more RT reporting parameters, or
- information associated with one or more transmission points, or
- information associated with one or more reception points, or
- confidence information, or
- any combination thereof.

Referring to FIGS. 9-10, in some designs (which may contribute to more efficient RT procedures, higher quality RT procedures, more accurate DT modeling, etc.), the RT configuration is pre-configured or pre-defined, or the RT configuration is received at the UE from the network component, or the RT configuration is selected by the UE, or a set of RT configurations is obtained at the UE, and an indication of the RT configuration from the set of RT configurations is received at the UE from the network component, or the set of RT configurations is obtained at the UE, and the RT configuration is selected by the UE from the set of RT configurations.

Referring to FIGS. 9-10, in some designs (which may contribute to more efficient RT procedures, higher quality RT procedures, more accurate DT modeling, etc.), the RT configuration comprises a baseline RT configuration and one or more additional parameters that are selected by the UE or indicated to the UE by the network component.

Referring to FIGS. 9-10, in some designs (which may contribute to more efficient RT procedures, higher quality RT procedures, more accurate DT modeling, etc.), the UE further transmits RT capability information to the network component (and the network component further receives the RT capability information). In an aspect, the RT configuration is based on the RT capability information. In an aspect, the RT capability information comprises:

- RT technique capability information, or
- RT computational capability information, or
- RT accuracy information associated with the UE, or
- RT precision information associated with the UE,
- RT accuracy information associated with one or more wireless devices to which the UE is connected, or
- RT precision information associated with one or more wireless devices to which the UE is connected, or
- any combination thereof.

Referring to FIGS. 9-10, in some designs (which may contribute to more efficient RT procedures, higher quality RT procedures, more accurate DT modeling, etc.), the RT report includes, e.g.:

- a number of electromagnetic (EM) fields per ray, or
- a power per ray, or
- an arrival timing per ray, or
- a time of flight per ray, or
- a phase per ray, or
- angle information, or
- information associated with ray interactions with the environment, or
- ray information per antenna pair, or
- one or more signal measurements at one or more receivers, or
- any combination thereof.

Referring to FIGS. 9-10, in some designs (which may contribute to more efficient RT procedures, higher quality RT procedures, more accurate DT modeling, etc.), the RT procedure comprises determination of a path of at least one signal from a network component to the UE. In a further aspect, the path from the at least one network component to the UE includes one or more reflections. In a further aspect, the ray tracing procedure comprises determination of ray interactions with an environment between the at least one network component and the UE. In a further aspect, the ray tracing configuration comprises parameters related to a simulated environment for which ray tracing is to be performed. In a further aspect, the ray tracing configuration comprises at least transmitter and receiver locations and details of an environment surrounding transmitters and receivers.

Referring to FIGS. 9-10, in a specific example, a wireless device can be configured by a network entity (e.g., gNB/LMF/SnMF or a DT entity) to run RT procedure(s) according to RT configurations (including assistance data to facilitate on-device RT) and providing RT-generated measurements back to the network entity. A few examples on RT configurations, e.g.:

- Method for RT, e.g.: Shoot-bounce ray (SBR) method, image method, hybrid method (e.g., SB and image), and/or
- Parameters for RT, e.g.: Resolution of RT (e.g., angle separation or number of rays, number of image reflections, etc.), Radio propagation parameters: # of reflections, # of transmissions through walls, number of diffractions, etc., and/or.
- Methodology for computing diffraction, e.g.: Uniform Asymptotic Theory (UAT), Geometric Theory of Diffraction (GTD), Uniform Theory of Diffraction (UTD), Physical Optics, Spectral Methods, Multi-edge Diffraction Methods: Deygout model, Epstein-Peterson model, etc., and/or
- Methodology for computing scattering, e.g.: Lambertian Scattering, Directive Scattering, Directive Backscattering, Multiple Scattering Theory, and/or
- Boundary for RT, e.g.: Area/region to apply RT, and/or
- Model aspect, e.g.: Baseline and updates on environment model (e.g., 3D model of environment, including changes, in a popular format), and/or
- Reporting aspects: report content, periodicity, events of RT outcomes, and/or Wireless aspects: location and configurations of TX and RX points (including antenna configurations).

Referring to FIGS. 9-10, in a specific example, the wireless device sends indicator on capabilities to network entity, receives configurations (including assistance data), performs ray tracing, and reports measurements/outcomes from raytracing operation.

Referring to FIGS. 9-10, in a specific example, a procedure for configuring ray tracing (RT) at a wireless device involves the wireless device to receive RT configuration from a network entity (e.g., DT entity/engine, LMF, SnMF, etc.) and using the RT configuration to conduct RT on the wireless device, and to report RT outcome from the wireless device to the network entity. In an aspect, the wireless device can also send an RT capability indicator to the network entity; the network entity uses the RT capabilities to decide on the RT configurations. In an aspect, the wireless device may send the RT capability based on a request from the network entity.

Referring to FIGS. 9-10, in a specific example, the RT capability indicator (or report) may include, e.g.:

Computational capabilities of the UE (such as CPU and GPU specs, multi-threading, peak vs avg performance, etc.), and/or Remaining battery resources of the UE, and/or Ground truth accuracy and precision of the UE, and/or Ground truth accuracy and precision of peer devices (such as WiFi Access Points, BLE or UWB devices, etc.) that are maintaining a link with the UE (for which RT may be performed). Note that such information pertaining to technologies other than NR, may not be known to the network entity.

Referring to FIGS. 9-10, in a specific example, RT configuration signaling can include baseline parameters and further refinements on baseline parameters to consider for different aspects, including RT method, RT model, wireless, reporting of RT outcomes, etc.

Referring to FIGS. 9-10, in a specific example, the RT configuration (baseline and/or refinement) can be signaled according to the following procedure options (e.g., the two options are meant to reduce signaling overhead when network entity needs to switch between different baseline configurations):

Option1: wireless device (i.e., UE) can be configured by the network entity with a set of RT configurations (i.e., set of RT parameters) that can be considered as candidates for baseline RT configuration; a baseline RT configuration can then be activated by letting wireless device receive the index of one of these RT configurations (e.g., this helps reducing signaling overhead when network entity needs to switch between different baseline configurations (depending on required RT accuracy/complexity)). In an aspect, the set of RT configurations can be signaled using RRC configurations and/or broadcast info (e.g., a future RT SIB)). Activation of one of the RT configurations as a baseline can happen using MAC-CE/DCI signaling that is sent through the gNB. Refinements can also be indicated explicitly through control plane (e.g., MAC-CE/DCI). It is also possible to signal the set of RT configurations and refinements as discussed above using a dedicated RT interface carried over data plane (e.g., similar to LPP).

Option2: wireless device (i.e., UE) can be configured by the network entity with a set of RT configurations (i.e., set of RT parameters) that can be considered as candidates for baseline RT configuration and also a set of RT configuration refinements; a baseline RT configuration can then be activated by letting wireless device receive the index of one of these RT configurations; further refinements can also be signaled by receiving the index of refinement candidate. In an aspect, the set of RT configurations and set of refinements can be signaled using RRC configurations and/or broadcast info (e.g., a future RT SIB). Activation of one of the RT configurations as a baseline can happen using MAC-CE/DCI signaling that is sent through the gNB. Refinements can also be indicated by signaling their index through control plane (e.g., MAC-CE/DCI). It is also possible to signal the set of RT configurations and refinements as discussed above using a dedicated RT interface carried over data plane (e.g., similar to LPP)

Referring to FIGS. 9-10, in a specific example, the wireless device (i.e., UE) can autonomously select a baseline RT configuration along with refinements based on the signaled sets from previous proposal; the wireless device conducts RT and reports to the network entity RT outcome along with indices of RT configuration and refinements (or explicit value of refinements). In an aspect, the reliability or confidence metric of the DT of a given region may be used by the device to select between RT configurations. For instance, if the UE is a premium device with superior capabilities for performing RT computations, and it lies in a region where the existing DT is poor quality (could be due to environmental/channel effects, or previous UEs in that region had inferior capabilities), then it may select a more aggressive RT configuration in order to improve the DT quality for that region. Note that the above RT configuration may be indicated by the network entity. In an aspect, the network entity may explicitly provide a more aggressive RT configuration to a UE with superior capabilities (and vice-versa).

Referring to FIGS. 9-10, in a specific example, an RT configuration can include the following aspects, e.g.:

Method for RT, e.g.: Shoot-bounce ray (SBR) method, image method, hybrid method (e.g., SB and image), and/or Parameters for RT, e.g.: Resolution of RT (e.g., angle separation or number of rays, number of image reflections, etc.), Radio propagation parameters: # of reflections, # of transmissions through walls, number of diffractions, etc., and/or Methodology for computing diffraction, e.g.: Uniform Asymptotic Theory (UAT), Geometric Theory of Diffraction (GTD), Uniform Theory of Diffraction (UTD), Physical Optics, Spectral Methods, Multi-edge Diffraction Methods: Deygout model, Epstein-Peterson model, etc., and/or Methodology for computing scattering, e.g.: Lambertian Scattering, Directive Scattering, Directive Backscattering, Multiple Scattering Theory, and/or Boundary for RT, e.g.: Area/region to apply RT, and/or Model aspect, e.g.: Baseline and updates on environment model (e.g., 3D model of environment, including changes, in a popular format), and/or Reporting aspects: report content, periodicity, events of RT outcomes, and/or Wireless aspects: location and configurations of TX and RX points (including antenna configurations), and/or DT aspects: location/region with a corresponding reliability or confidence score (that represents the network's confidence in the existing DT of the said region).

Referring to FIGS. 9-10, in a specific example, an RT outcome (i.e., result) may include some or all of the following, e.g.:

Expected received ray info (e.g., EM fields per ray, power, arrival timing/time of flight, and/or phase per ray, polarization information per ray, angle information (angle of departure/arrival), ray interactions with environment (e.g., points of reflection/diffraction/scattering, etc.), and/or Ray info per antenna pair (TX-RX antenna pairs), and/or RSRP/RSRQ/SINR at RX Referring to FIGS. 9-10, in a specific example, an RT UE capability may include indications of support (or lack of support) for some or all of the following, e.g.:

Method(s) for RT, e.g.: Shoot-bounce ray (SBR) method, image method, hybrid method (e.g., SB and image), and/or Parameters for RT, e.g.: Resolution of RT (e.g., angle separation or number of rays, number of image reflections, etc.), radio propagation parameters (e.g., number of reflections, number of transmissions through walls, number of diffractions, etc.), and/or Methodology for computing diffraction: Uniform Asymptotic Theory (UAT), Geometric Theory of Diffraction (GTD), Uniform Theory of Diffraction (UTD), Physical Optics, Spectral Methods, Multi-edge Diffraction Methods: Deygout model, Epstein-Peterson model, etc., and/or Methodology for computing scattering, e.g., Lambertian Scattering, Directive Scattering, Directive Backscattering, Multiple Scattering Theory, and/or Boundary for RT: Area/region to apply RT.

Figure 11:
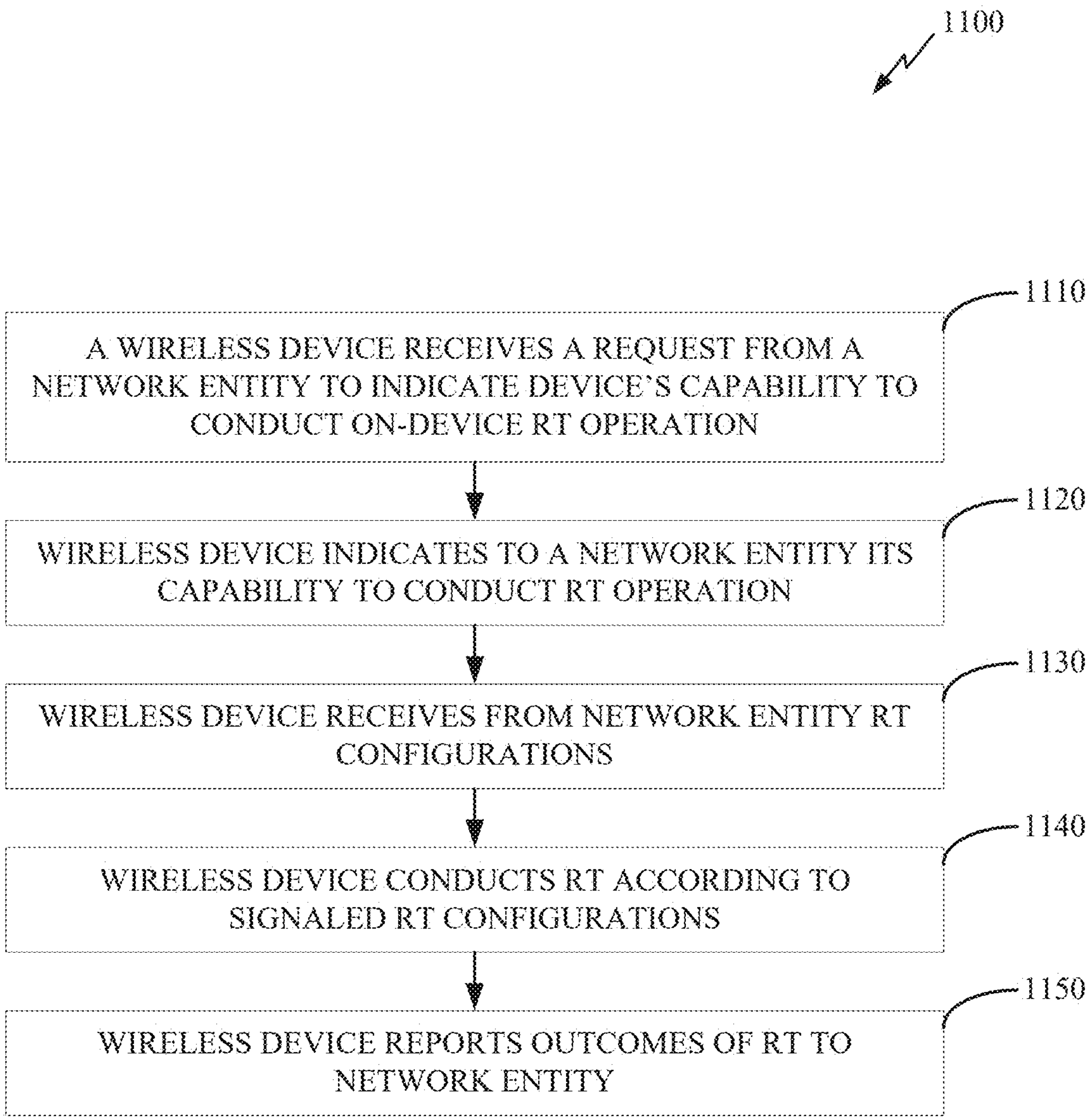
FIG. 11 illustrates an example implementation of the process of FIG. 9, in accordance with aspects of the disclosure.

FIG. 11 illustrates an example implementation 1100 of the process 900 of FIG. 9, in accordance with aspects of the disclosure. While not expressly illustrated, a parallel process (similar to FIG. 10) may be implemented at the network component in conjunction with the process 1100 of FIG. 11.

Referring to FIG. 11, at 1110, a wireless device receives a request from a network entity to indicate a capability of the wireless device to conduct on-device RT procedure. At 1120, the wireless device indicates to a network entity its capability to conduct RT procedure. At 1130, the wireless device receives from network entity RT configuration(s). At 1140, the wireless device conducts RT according to signaled RT configuration(s). At 1150, the wireless device reports outcomes of RT to network entity.

Figure 12:
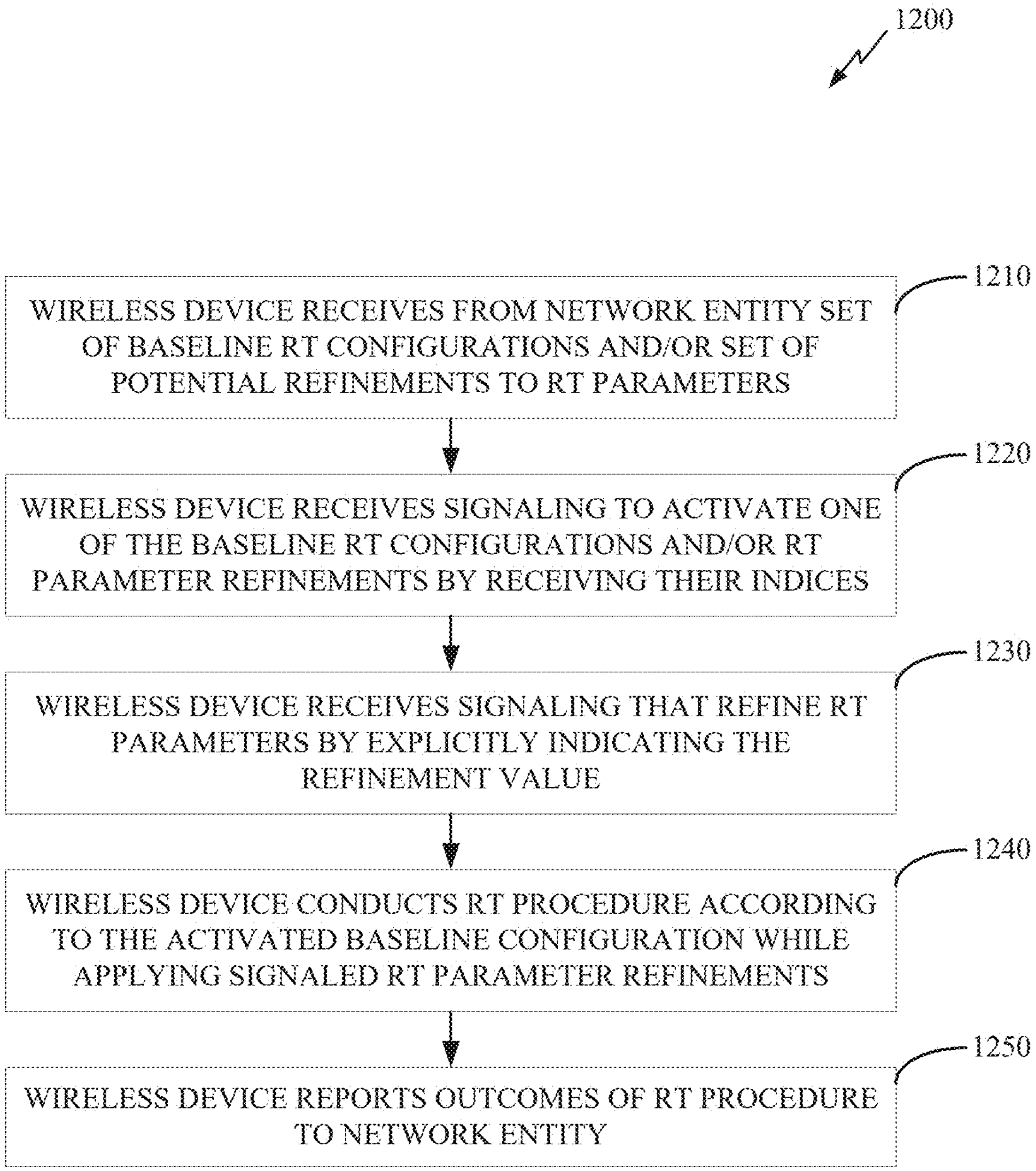
FIG. 12 illustrates an example implementation of the process of FIG. 9, in accordance with aspects of the disclosure.

FIG. 12 illustrates an example implementation 1200 of the process 900 of FIG. 9, in accordance with aspects of the disclosure. While not expressly illustrated, a parallel process (similar to FIG. 10) may be implemented at the network component in conjunction with the process 1200 of FIG. 12.

Referring to FIG. 12, at 1210, a wireless device receives from a network entity a set of baseline RT configurations and/or set of potential refinements to RT parameters. At 1220, the wireless device receives signaling to activate one of the baseline RT configurations and/or RT parameter refinements by receiving their indices. At 1230, the wireless device receives signaling that refine RT parameters by explicitly indicating the refinement value. At 1240, the wireless device conducts RT procedure according to the activated baseline configuration while applying signaled RT parameter refinements. At 1250, the wireless device reports outcomes of RT procedure to the network entity.

Figure 13:
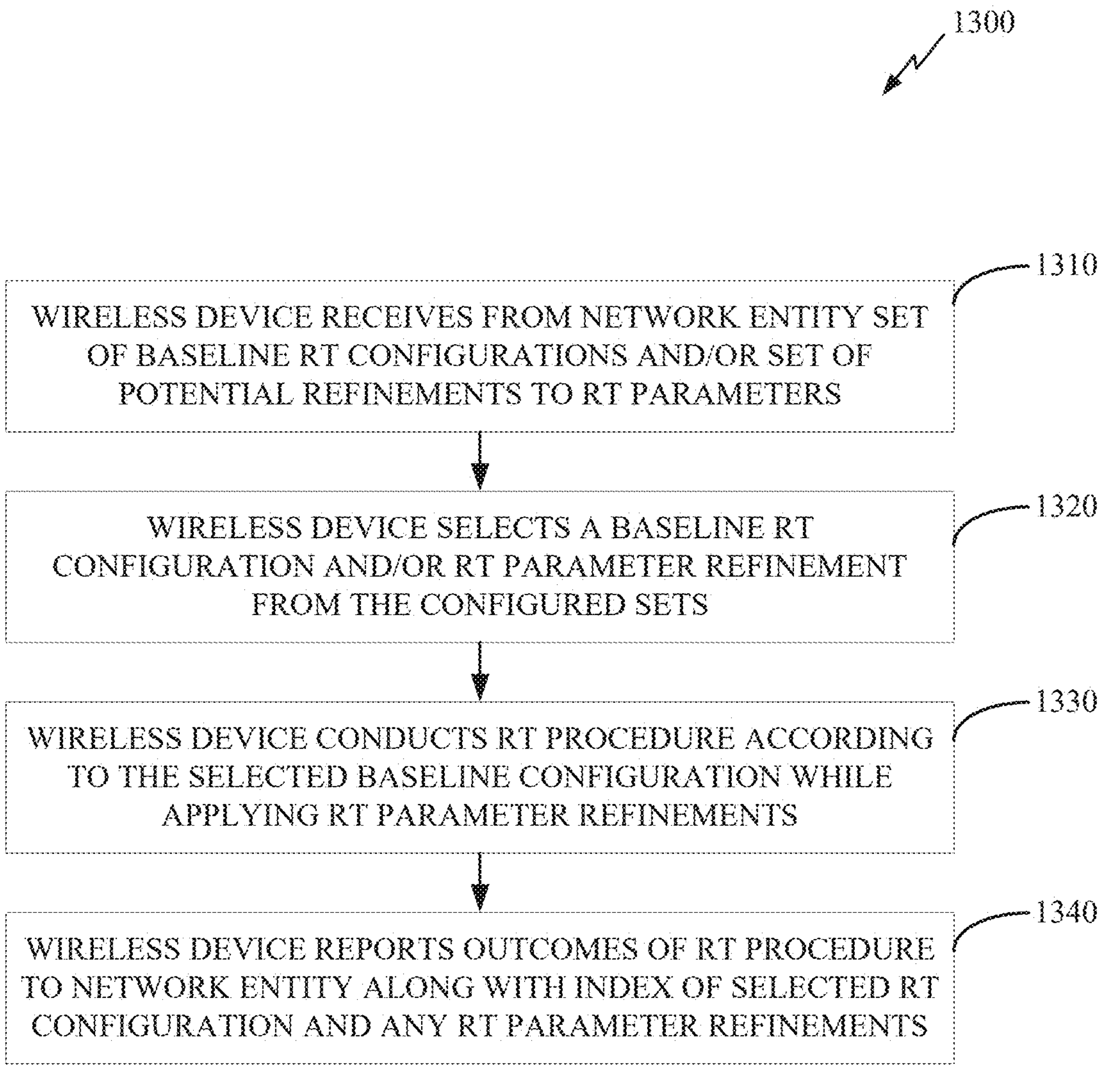
FIG. 13 illustrates an example implementation of the process of FIG. 9, in accordance with aspects of the disclosure.

FIG. 13 illustrates an example implementation 1300 of the process 900 of FIG. 9, in accordance with aspects of the disclosure. While not expressly illustrated, a parallel process (similar to FIG. 10) may be implemented at the network component in conjunction with the process 1300 of FIG. 13.

Referring to FIG. 13, at 1310, a wireless device receives from a network entity a set of baseline RT configurations and/or set of potential refinements to RT parameters. At 1320, the wireless device selects a baseline RT configuration and/or RT parameter refinement from the configured sets. At 1330, the wireless device conducts RT procedure according to the selected baseline configuration while applying RT parameter refinements. At 1340, the wireless device reports outcomes of RT procedure to network entity along with index of selected RT configuration and any RT parameter refinements.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method performed by a user equipment (UE), comprising: determining a ray-tracing (RT) configuration for a RT procedure associated with modeling one or more wireless channels in an environment; performing the RT procedure based on a model of the environment and the RT configuration; and transmitting a RT report based on the RT procedure to a network component.

Clause 2. The method of clause 1, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 3. The method of any of clauses 1 to 2, wherein the RT configuration is pre-configured or pre-defined, or wherein the RT configuration is received at the UE from the network component, or wherein the RT configuration is selected by the UE, or wherein a set of RT configurations is obtained at the UE, and an indication of the RT configuration from the set of RT configurations is received at the UE from the network component, or wherein the set of RT configurations is obtained at the UE, and the RT configuration is selected by the UE from the set of RT configurations.

Clause 4. The method of any of clauses 1 to 3, wherein the RT configuration comprises a baseline RT configuration and one or more additional parameters that are selected by the UE or indicated to the UE by the network component.

Clause 5. The method of any of clauses 1 to 4, further comprising: transmitting RT capability information to the network component, wherein the RT configuration is based on the RT capability information.

Clause 6. The method of clause 5, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 7. The method of any of clauses 1 to 6, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Clause 8. A method performed by a network component, comprising: receiving a ray-tracing (RT) report based on a RT procedure that is performed by a user equipment and is associated with modeling one or more wireless channels in an environment, the RT procedure based on a model of the environment and a RT configuration; and updating a digital twin (DT) of the environment based on the RT report.

Clause 9. The method of clause 8, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 10. The method of any of clauses 8 to 9, wherein the RT configuration is pre-configured or pre-defined, or wherein the RT configuration is transmitted to the UE by the network component, or wherein the RT configuration is selected by the UE, or wherein a set of RT configurations is obtained at the UE, and an indication of the RT configuration from the set of RT configurations is transmitted to the UE from the network component, or wherein the set of RT configurations is obtained at the UE, and the RT configuration is selected by the UE from the set of RT configurations.

Clause 11. The method of any of clauses 8 to 10, wherein the RT configuration comprises a baseline RT configuration and one or more additional parameters that are selected by the UE or indicated to the UE by the network component.

Clause 12. The method of any of clauses 8 to 11, further comprising: receiving RT capability information to the network component, wherein the RT configuration is based on the RT capability information.

Clause 13. The method of clause 12, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 14. The method of any of clauses 8 to 13, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Clause 15. A user equipment (UE), comprising: one or more memories; one or more transceivers; and one or more processors communicatively coupled to the one or more memories and the one or more transceivers, the one or more processors, either alone or in combination, configured to: determine a ray-tracing (RT) configuration for a RT procedure associated with modeling one or more wireless channels in an environment; perform the RT procedure based on a model of the environment and the RT configuration; and transmit, via the one or more transceivers, a RT report based on the RT procedure to a network component.

Clause 16. The UE of clause 15, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 17. The UE of any of clauses 15 to 16, wherein the RT configuration is pre-configured or pre-defined, or wherein the RT configuration is received at the UE from the network component, or wherein the RT configuration is selected by the UE, or wherein a set of RT configurations is obtained at the UE, and an indication of the RT configuration from the set of RT configurations is received at the UE from the network component, or wherein the set of RT configurations is obtained at the UE, and the RT configuration is selected by the UE from the set of RT configurations.

Clause 18. The UE of any of clauses 15 to 17, wherein the RT configuration comprises a baseline RT configuration and one or more additional parameters that are selected by the UE or indicated to the UE by the network component.

Clause 19. The UE of any of clauses 15 to 18, wherein the one or more processors, either alone or in combination, are further configured to: transmit, via the one or more transceivers, RT capability information to the network component, wherein the RT configuration is based on the RT capability information.

Clause 20. The UE of clause 19, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 21. The UE of any of clauses 15 to 20, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Clause 22. A network component, comprising: one or more memories; one or more transceivers; and one or more processors communicatively coupled to the one or more memories and the one or more transceivers, the one or more processors, either alone or in combination, configured to: receive, via the one or more transceivers, a ray-tracing (RT) report based on a RT procedure that is performed by a user equipment and is associated with modeling one or more wireless channels in an environment, the RT procedure based on a model of the environment and a RT configuration; and update a digital twin (DT) of the environment based on the RT report.

Clause 23. The network component of clause 22, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 24. The network component of any of clauses 22 to 23, wherein the RT configuration is pre-configured or pre-defined, or wherein the RT configuration is transmitted to the UE by the network component, or wherein the RT configuration is selected by the UE, or wherein a set of RT configurations is obtained at the UE, and an indication of the RT configuration from the set of RT configurations is transmitted to the UE from the network component, or wherein the set of RT configurations is obtained at the UE, and the RT configuration is selected by the UE from the set of RT configurations.

Clause 25. The network component of any of clauses 22 to 24, wherein the RT configuration comprises a baseline RT configuration and one or more additional parameters that are selected by the UE or indicated to the UE by the network component.

Clause 26. The network component of any of clauses 22 to 25, wherein the one or more processors, either alone or in combination, are further configured to: receive, via the one or more transceivers, RT capability information to the network component, wherein the RT configuration is based on the RT capability information.

Clause 27. The network component of clause 26, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 28. The network component of any of clauses 22 to 27, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Clause 29. A user equipment (UE), comprising: means for determining a ray-tracing (RT) configuration for a RT procedure associated with modeling one or more wireless channels in an environment; means for performing the RT procedure based on a model of the environment and the RT configuration; and means for transmitting a RT report based on the RT procedure to a network component.

Clause 30. The UE of clause 29, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 31. The UE of any of clauses 29 to 30, wherein the RT configuration is pre-configured or pre-defined, or wherein the RT configuration is received at the UE from the network component, or wherein the RT configuration is selected by the UE, or wherein a set of RT configurations is obtained at the UE, and an indication of the RT configuration from the set of RT configurations is received at the UE from the network component, or wherein the set of RT configurations is obtained at the UE, and the RT configuration is selected by the UE from the set of RT configurations.

Clause 32. The UE of any of clauses 29 to 31, wherein the RT configuration comprises a baseline RT configuration and one or more additional parameters that are selected by the UE or indicated to the UE by the network component.

Clause 33. The UE of any of clauses 29 to 32, further comprising: means for transmitting RT capability information to the network component, wherein the RT configuration is based on the RT capability information.

Clause 34. The UE of clause 33, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 35. The UE of any of clauses 29 to 34, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Clause 36. A network component, comprising: means for receiving a ray-tracing (RT) report based on a RT procedure that is performed by a user equipment and is associated with modeling one or more wireless channels in an environment, the RT procedure based on a model of the environment and a RT configuration; and means for updating a digital twin (DT) of the environment based on the RT report.

Clause 37. The network component of clause 36, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 38. The network component of any of clauses 36 to 37, wherein the RT configuration is pre-configured or pre-defined, or wherein the RT configuration is transmitted to the UE by the network component, or wherein the RT configuration is selected by the UE, or wherein a set of RT configurations is obtained at the UE, and an indication of the RT configuration from the set of RT configurations is transmitted to the UE from the network component, or wherein the set of RT configurations is obtained at the UE, and the RT configuration is selected by the UE from the set of RT configurations.

Clause 39. The network component of any of clauses 36 to 38, wherein the RT configuration comprises a baseline RT configuration and one or more additional parameters that are selected by the UE or indicated to the UE by the network component.

Clause 40. The network component of any of clauses 36 to 39, further comprising: means for receiving RT capability information to the network component, wherein the RT configuration is based on the RT capability information.

Clause 41. The network component of clause 40, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 42. The network component of any of clauses 36 to 41, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Clause 43. A non-transitory computer-readable medium storing computer-executable instructions that, when executed by a user equipment (UE), cause the UE to: determine a ray-tracing (RT) configuration for a RT procedure associated with modeling one or more wireless channels in an environment; perform the RT procedure based on a model of the environment and the RT configuration; and transmit a RT report based on the RT procedure to a network component.

Clause 44. The non-transitory computer-readable medium of clause 43, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 45. The non-transitory computer-readable medium of any of clauses 43 to 44, wherein the RT configuration is pre-configured or pre-defined, or wherein the RT configuration is received at the UE from the network component, or wherein the RT configuration is selected by the UE, or wherein a set of RT configurations is obtained at the UE, and an indication of the RT configuration from the set of RT configurations is received at the UE from the network component, or wherein the set of RT configurations is obtained at the UE, and the RT configuration is selected by the UE from the set of RT configurations.

Clause 46. The non-transitory computer-readable medium of any of clauses 43 to 45, wherein the RT configuration comprises a baseline RT configuration and one or more additional parameters that are selected by the UE or indicated to the UE by the network component.

Clause 47. The non-transitory computer-readable medium of any of clauses 43 to 46, further comprising computer-executable instructions that, when executed by the UE, cause the UE to: transmit RT capability information to the network component, wherein the RT configuration is based on the RT capability information.

Clause 48. The non-transitory computer-readable medium of clause 47, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 49. The non-transitory computer-readable medium of any of clauses 43 to 48, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Clause 50. A non-transitory computer-readable medium storing computer-executable instructions that, when executed by a network component, cause the network component to: receive a ray-tracing (RT) report based on a RT procedure that is performed by a user equipment and is associated with modeling one or more wireless channels in an environment, the RT procedure based on a model of the environment and a RT configuration; and update a digital twin (DT) of the environment based on the RT report.

Clause 51. The non-transitory computer-readable medium of clause 50, wherein the RT configuration comprises: a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

Clause 52. The non-transitory computer-readable medium of any of clauses 50 to 51, wherein the RT configuration is pre-configured or pre-defined, or wherein the RT configuration is transmitted to the UE by the network component, or wherein the RT configuration is selected by the UE, or wherein a set of RT configurations is obtained at the UE, and an indication of the RT configuration from the set of RT configurations is transmitted to the UE from the network component, or wherein the set of RT configurations is obtained at the UE, and the RT configuration is selected by the UE from the set of RT configurations.

Clause 53. The non-transitory computer-readable medium of any of clauses 50 to 52, wherein the RT configuration comprises a baseline RT configuration and one or more additional parameters that are selected by the UE or indicated to the UE by the network component.

Clause 54. The non-transitory computer-readable medium of any of clauses 50 to 53, further comprising computer-executable instructions that, when executed by the network component, cause the network component to: receive RT capability information to the network component, wherein the RT configuration is based on the RT capability information.

Clause 55. The non-transitory computer-readable medium of clause 54, wherein the RT capability information comprises: RT technique capability information, or RT computational capability information, or RT accuracy information associated with the UE, or RT precision information associated with the UE, RT accuracy information associated with one or more wireless devices to which the UE is connected, or RT precision information associated with one or more wireless devices to which the UE is connected, or any combination thereof.

Clause 56. The non-transitory computer-readable medium of any of clauses 50 to 55, wherein the RT report comprises: a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have,"

"having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method performed by a user equipment (UE), comprising:
- transmitting ray-tracing (RT) capability information to a network component;
- determining a RT configuration for a RT procedure associated with modeling one or more wireless channels in an environment, wherein the RT configuration is based on the RT capability information;
- performing the RT procedure based on a model of the environment and the RT configuration; and
- transmitting a RT report based on the RT procedure to the network component.

2. The method of claim 1, wherein the RT configuration comprises:
- a RT technique corresponding to one of a shoot-bounce ray (SBR) technique, an image technique, or a combination thereof, or
- a RT resolution, or
- one or more radio propagation parameters, or
- one or more diffraction parameters, or
- one or more scattering parameters, or
- one or more spatial parameters, or
- one or more RT modeling parameters, or
- one or more RT reporting parameters, or
- information associated with one or more transmission points, or
- information associated with one or more reception points, or
- confidence information, or
- any combination thereof.

3. The method of claim 1,
- wherein the RT configuration is pre-configured or predefined, or
- wherein the RT configuration is received at the UE from the network component, or
- wherein the RT configuration is selected by the UE, or
- wherein a set of RT configurations is obtained at the UE, and an indication of the RT configuration from the set of RT configurations is received at the UE from the network component, or
- wherein the set of RT configurations is obtained at the UE, and the RT configuration is selected by the UE from the set of RT configurations.

4. The method of claim 1, wherein the RT configuration comprises a baseline RT configuration and one or more additional parameters that are selected by the UE or indicated to the UE by the network component.

5. The method of claim 1, wherein the RT capability information comprises:
- RT technique capability information, or
- RT computational capability information, or
- RT accuracy information associated with the UE, or
- RT precision information associated with the UE,
- RT accuracy information associated with one or more wireless devices to which the UE is connected, or
- RT precision information associated with one or more wireless devices to which the UE is connected, or
- any combination thereof.

6. The method of claim 1, wherein the RT report comprises:
- a number of electromagnetic (EM) fields per ray, or
- a power per ray, or
- an arrival timing per ray, or
- a time of flight per ray, or
- a phase per ray, or
- angle information, or
- information associated with ray interactions with the environment, or
- ray information per antenna pair, or
- one or more signal measurements at one or more receivers, or
- any combination thereof.

7. A method performed by a network component, comprising:
- receiving ray-tracing (RT) capability information;
- receiving a RT report based on a RT procedure that is performed by a user equipment (UE) and is associated with modeling one or more wireless channels in an environment, the RT procedure based on a model of the environment and a RT configuration, wherein the RT configuration is based on the RT capability information; and
- updating a digital twin (DT) of the environment based on the RT report.

8. The method of claim 7, wherein the RT configuration comprises:
- a RT technique corresponding to one of a shoot-bounce ray (SBR) technique, an image technique, or a combination thereof, or
- a RT resolution, or
- one or more radio propagation parameters, or
- one or more diffraction parameters, or
- one or more scattering parameters, or
- one or more spatial parameters, or
- one or more RT modeling parameters, or
- one or more RT reporting parameters, or
- information associated with one or more transmission points, or
- information associated with one or more reception points, or
- confidence information, or
- any combination thereof.

9. The method of claim 7,
- wherein the RT configuration is pre-configured or predefined, or
- wherein the RT configuration is transmitted to the UE by the network component, or
- wherein the RT configuration is selected by the UE, or wherein a set of RT configurations is obtained at the UE, and an indication of the RT configuration from the set of RT configurations is transmitted to the UE from the network component, or wherein the set of RT configurations is obtained at the UE, and the RT configuration is selected by the UE from the set of RT configurations.

10. The method of claim 7, wherein the RT configuration comprises a baseline RT configuration and one or more additional parameters that are selected by the UE or indicated to the UE by the network component.

11. The method of claim 7, wherein the RT capability information comprises:

RT technique capability information, or

RT computational capability information, or

RT accuracy information associated with the UE, or

RT precision information associated with the UE,

RT accuracy information associated with one or more wireless devices to which the UE is connected, or RT precision information associated with one or more wireless devices to which the UE is connected, or any combination thereof.

12. The method of claim 7, wherein the RT report comprises:

a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

13. A user equipment (UE), comprising:

one or more memories;

one or more transceivers; and one or more processors communicatively coupled to the one or more memories and the one or more transceivers, the one or more processors, either alone or in combination, configured to:

transmit, via the one or more transceivers, ray-tracing (RT) capability information to a network component;

determine a RT configuration for a RT procedure associated with modeling one or more wireless channels in an environment, wherein the RT configuration is based on the RT capability information;

perform the RT procedure based on a model of the environment and the RT configuration; and transmit, via the one or more transceivers, a RT report based on the RT procedure to the network component.

14. The UE of claim 13, wherein the RT configuration comprises:

a RT technique corresponding to one of a shoot-bounce ray (SBR) technique, an image technique, or a combination thereof, or a RT resolution, or one or more radio propagation parameters, or one or more diffraction parameters, or one or more scattering parameters, or one or more spatial parameters, or one or more RT modeling parameters, or one or more RT reporting parameters, or information associated with one or more transmission points, or information associated with one or more reception points, or confidence information, or any combination thereof.

15. The UE of claim 13, wherein the RT configuration is pre-configured or pre-defined, or wherein the RT configuration is received at the UE from the network component, or wherein the RT configuration is selected by the UE, or wherein a set of RT configurations is obtained at the UE, and an indication of the RT configuration from the set of RT configurations is received at the UE from the network component, or wherein the set of RT configurations is obtained at the UE, and the RT configuration is selected by the UE from the set of RT configurations.

16. The UE of claim 13, wherein the RT configuration comprises a baseline RT configuration and one or more additional parameters that are selected by the UE or indicated to the UE by the network component.

17. The UE of claim 13, wherein the RT capability information comprises:

RT technique capability information, or

RT computational capability information, or

RT accuracy information associated with the UE, or

RT precision information associated with the UE,

RT accuracy information associated with one or more wireless devices to which the UE is connected, or RT precision information associated with one or more wireless devices to which the UE is connected, or any combination thereof.

18. The UE of claim 13, wherein the RT report comprises:

a number of electromagnetic (EM) fields per ray, or a power per ray, or an arrival timing per ray, or a time of flight per ray, or a phase per ray, or angle information, or information associated with ray interactions with the environment, or ray information per antenna pair, or one or more signal measurements at one or more receivers, or any combination thereof.

19. A network component, comprising:

one or more memories;

one or more transceivers; and one or more processors communicatively coupled to the one or more memories and the one or more transceivers, the one or more processors, either alone or in combination, configured to:

receive, via the one or more transceivers, ray-tracing (RT) capability;

receive, via the one or more transceivers, a RT report based on a RT procedure that is performed by a user equipment (UE) and is associated with modeling one or more wireless channels in an environment, the RT procedure based on a model of the environment and a RT configuration, wherein the RT configuration is based on the RT capability information; and update a digital twin (DT) of the environment based on the RT report.

20. The network component of claim 19, wherein the RT configuration comprises:

a RT technique corresponding to one of a shoot-bounce ray (SBR) technique, an image technique, or a combination thereof, or
a RT resolution, or
one or more radio propagation parameters, or
one or more diffraction parameters, or
one or more scattering parameters, or
one or more spatial parameters, or
one or more RT modeling parameters, or
one or more RT reporting parameters, or
information associated with one or more transmission points, or
information associated with one or more reception points, or
confidence information, or
any combination thereof.

21. The network component of claim 19,
wherein the RT configuration is pre-configured or pre-defined, or
wherein the RT configuration is transmitted to the UE by the network component, or
wherein the RT configuration is selected by the UE, or
wherein a set of RT configurations is obtained at the UE, and an indication of the RT configuration from the set of RT configurations is transmitted to the UE from the network component, or
wherein the set of RT configurations is obtained at the UE, and the RT configuration is selected by the UE from the set of RT configurations.

22. The network component of claim 19, wherein the RT configuration comprises a baseline RT configuration and one or more additional parameters that are selected by the UE or indicated to the UE by the network component.

23. The network component of claim 19, wherein the RT capability information comprises:
RT technique capability information, or
RT computational capability information, or
RT accuracy information associated with the UE, or
RT precision information associated with the UE,
RT accuracy information associated with one or more wireless devices to which the UE is connected, or
RT precision information associated with one or more wireless devices to which the UE is connected, or
any combination thereof.

24. The network component of claim 19, wherein the RT report comprises:
a number of electromagnetic (EM) fields per ray, or
a power per ray, or
an arrival timing per ray, or
a time of flight per ray, or
a phase per ray, or
angle information, or
information associated with ray interactions with the environment, or
ray information per antenna pair, or
one or more signal measurements at one or more receivers, or
any combination thereof.

25. A user equipment (UE), comprising:
means for transmitting ray-tracing (RT) capability information to a network component;
means for determining a RT configuration for a RT procedure associated with modeling one or more wireless channels in an environment, wherein the RT configuration is based on the RT capability information;
means for performing the RT procedure based on a model of the environment and the RT configuration; and
means for transmitting a RT report based on the RT procedure to the network component.

26. The UE of claim 25, wherein the RT configuration comprises:
a RT technique corresponding to one of a shoot-bounce ray (SBR) technique, an image technique, or a combination thereof, or
a RT resolution, or
one or more radio propagation parameters, or
one or more diffraction parameters, or
one or more scattering parameters, or
one or more spatial parameters, or
one or more RT modeling parameters, or
one or more RT reporting parameters, or
information associated with one or more transmission points, or
information associated with one or more reception points, or
confidence information, or
any combination thereof.

27. The UE of claim 25,
wherein the RT configuration is pre-configured or pre-defined, or
wherein the RT configuration is received at the UE from the network component, or
wherein the RT configuration is selected by the UE, or
wherein a set of RT configurations is obtained at the UE, and an indication of the RT configuration from the set of RT configurations is received at the UE from the network component, or
wherein the set of RT configurations is obtained at the UE, and the RT configuration is selected by the UE from the set of RT configurations.

28. The UE of claim 25, wherein the RT configuration comprises a baseline RT configuration and one or more additional parameters that are selected by the UE or indicated to the UE by the network component.

29. The UE of claim 25, wherein the RT capability information comprises:
RT technique capability information, or
RT computational capability information, or
RT accuracy information associated with the UE, or
RT precision information associated with the UE,
RT accuracy information associated with one or more wireless devices to which the UE is connected, or
RT precision information associated with one or more wireless devices to which the UE is connected, or
any combination thereof.

30. The UE of claim 25, wherein the RT report comprises:
a number of electromagnetic (EM) fields per ray, or
a power per ray, or
an arrival timing per ray, or
a time of flight per ray, or
a phase per ray, or
angle information, or
information associated with ray interactions with the environment, or
ray information per antenna pair, or
one or more signal measurements at one or more receivers, or
any combination thereof.

31. A network component, comprising:
means for receiving ray-tracing (RT) capability information;
means for receiving a RT report based on a RT procedure that is performed by a user equipment (UE) and is associated with modeling one or more wireless channels in an environment, the RT procedure based on a model of the environment and a RT configuration, wherein the RT configuration is based on the RT capability information; and means for updating a digital twin (DT) of the environment based on the RT report.

32. The network component of claim 31, wherein the RT configuration comprises:

a RT technique corresponding to one of a shoot-bounce ray (SBR) technique, an image technique, or a combination thereof, or
a RT resolution, or
one or more radio propagation parameters, or
one or more diffraction parameters, or
one or more scattering parameters, or
one or more spatial parameters, or
one or more RT modeling parameters, or
one or more RT reporting parameters, or
information associated with one or more transmission points, or
information associated with one or more reception points, or
confidence information, or
any combination thereof.

33. The network component of claim 31, wherein the RT configuration is pre-configured or predefined, or
wherein the RT configuration is transmitted to the UE by the network component, or
wherein the RT configuration is selected by the UE, or
wherein a set of RT configurations is obtained at the UE, and an indication of the RT configuration from the set of RT configurations is transmitted to the UE from the network component, or
wherein the set of RT configurations is obtained at the UE, and the RT configuration is selected by the UE from the set of RT configurations.

34. The network component of claim 31, wherein the RT configuration comprises a baseline RT configuration and one or more additional parameters that are selected by the UE or indicated to the UE by the network component.

35. The network component of claim 31, wherein the RT capability information comprises:

RT technique capability information, or
RT computational capability information, or
RT accuracy information associated with the UE, or
RT precision information associated with the UE,
RT accuracy information associated with one or more wireless devices to which the UE is connected, or
RT precision information associated with one or more wireless devices to which the UE is connected, or
any combination thereof.

36. The network component of claim 31, wherein the RT report comprises:

a number of electromagnetic (EM) fields per ray, or
a power per ray, or
an arrival timing per ray, or
a time of flight per ray, or
a phase per ray, or
angle information, or
information associated with ray interactions with the environment, or
ray information per antenna pair, or
one or more signal measurements at one or more receivers, or
any combination thereof.

37. A non-transitory computer-readable medium storing computer-executable instructions that, when executed by a user equipment (UE), cause the UE to:

transmit ray-tracing (RT) capability information to a network component;
determine a RT configuration for a RT procedure associated with modeling one or more wireless channels in an environment, wherein the RT configuration is based on the RT capability information;
perform the RT procedure based on a model of the environment and the RT configuration; and
transmit a RT report based on the RT procedure to the network component.

38. The non-transitory computer-readable medium of claim 37, wherein the RT configuration comprises:

a RT technique corresponding to one of a shoot-bounce ray (SBR) technique, an image technique, or a combination thereof, or
a RT resolution, or
one or more radio propagation parameters, or
one or more diffraction parameters, or
one or more scattering parameters, or
one or more spatial parameters, or
one or more RT modeling parameters, or
one or more RT reporting parameters, or
information associated with one or more transmission points, or
information associated with one or more reception points, or
confidence information, or
any combination thereof.

39. The non-transitory computer-readable medium of claim 37, wherein the RT configuration is pre-configured or predefined, or
wherein the RT configuration is received at the UE from the network component, or
wherein the RT configuration is selected by the UE, or
wherein a set of RT configurations is obtained at the UE, and an indication of the RT configuration from the set of RT configurations is received at the UE from the network component, or
wherein the set of RT configurations is obtained at the UE, and the RT configuration is selected by the UE from the set of RT configurations.

40. The non-transitory computer-readable medium of claim 37, wherein the RT configuration comprises a baseline RT configuration and one or more additional parameters that are selected by the UE or indicated to the UE by the network component.

41. The non-transitory computer-readable medium of claim 37, wherein the RT capability information comprises:

RT technique capability information, or
RT computational capability information, or
RT accuracy information associated with the UE, or
RT precision information associated with the UE,
RT accuracy information associated with one or more wireless devices to which the UE is connected, or
RT precision information associated with one or more wireless devices to which the UE is connected, or
any combination thereof.

42. The non-transitory computer-readable medium of claim 37, wherein the RT report comprises:

a number of electromagnetic (EM) fields per ray, or
a power per ray, or
an arrival timing per ray, or
a time of flight per ray, or a phase per ray, or
angle information, or
information associated with ray interactions with the environment, or
ray information per antenna pair, or
one or more signal measurements at one or more receivers, or
any combination thereof.

43. A non-transitory computer-readable medium storing computer-executable instructions that, when executed by a network component, cause the network component to:
receive ray-tracing (RT) capability information;
receive a RT report based on a RT procedure that is performed by a user equipment (UE) and is associated with modeling one or more wireless channels in an environment, the RT procedure based on a model of the environment and a RT configuration, wherein the RT configuration is based on the RT capability information; and
update a digital twin (DT) of the environment based on the RT report.

44. The non-transitory computer-readable medium of claim 43, wherein the RT configuration comprises:
a RT technique corresponding to one of a shoot-bounce ray (SBR) technique, an image technique, or a combination thereof, or
a RT resolution, or
one or more radio propagation parameters, or
one or more diffraction parameters, or
one or more scattering parameters, or
one or more spatial parameters, or
one or more RT modeling parameters, or
one or more RT reporting parameters, or
information associated with one or more transmission points, or
information associated with one or more reception points, or
confidence information, or
any combination thereof.

45. The non-transitory computer-readable medium of claim 43,
wherein the RT configuration is pre-configured or predefined, or
wherein the RT configuration is transmitted to the UE by the network component, or
wherein the RT configuration is selected by the UE, or
wherein a set of RT configurations is obtained at the UE, and an indication of the RT configuration from the set of RT configurations is transmitted to the UE from the network component, or
wherein the set of RT configurations is obtained at the UE, and the RT configuration is selected by the UE from the set of RT configurations.

46. The non-transitory computer-readable medium of claim 43, wherein the RT configuration comprises a baseline RT configuration and one or more additional parameters that are selected by the UE or indicated to the UE by the network component.

47. The non-transitory computer-readable medium of claim 43, wherein the RT capability information comprises:
RT technique capability information, or
RT computational capability information, or
RT accuracy information associated with the UE, or
RT precision information associated with the UE,
RT accuracy information associated with one or more wireless devices to which the UE is connected, or
RT precision information associated with one or more wireless devices to which the UE is connected, or
any combination thereof.

48. The non-transitory computer-readable medium of claim 43, wherein the RT report comprises:
a number of electromagnetic (EM) fields per ray, or
a power per ray, or
an arrival timing per ray, or
a time of flight per ray, or
a phase per ray, or
angle information, or
information associated with ray interactions with the environment, or
ray information per antenna pair, or
one or more signal measurements at one or more receivers, or
any combination thereof.

* * * * *